US012634942B2

(12) United States Patent
Huang et al.

(10) Patent No.: US 12,634,942 B2
(45) Date of Patent: May 19, 2026

(54) PUCCH ENHANCEMENTS FOR RADAR COEXISTENCE

(71) Applicant: InterDigital Patent Holdings, Inc., Wilmington, DE (US)

(72) Inventors: Joe Huang, Montville, NJ (US); Sudhir Pattar, Mount Laurel, NJ (US); Philip Pietraski, Jericho, NY (US); Tariq Elkourdi, Belleville, NJ (US); Phillip Leithead, King of Prussia, PA (US); Daniel Steinbach, Commack, NY (US); Jane Mack, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 375 days.

(21) Appl. No.: 18/141,163

(22) Filed: Apr. 28, 2023

(65) Prior Publication Data

US 2023/0354341 A1    Nov. 2, 2023

Related U.S. Application Data

(60) Provisional application No. 63/336,639, filed on Apr. 29, 2022.

(51) Int. Cl.
*H04W 72/21*        (2023.01)
*H04W 72/1263*      (2023.01)
        (Continued)

(52) U.S. Cl.
CPC ....... *H04W 72/21* (2023.01); *H04W 72/1263* (2013.01); *H04W 72/231* (2023.01); *H04W 72/541* (2023.01)

(58) Field of Classification Search
CPC . H04W 72/21; H04W 72/541; H04W 72/231; H04W 72/1263; H04W 72/23
See application file for complete search history.

(56) References Cited

U.S. PATENT DOCUMENTS 11,540,260 B1 * 12/2022 Krasniqi ............. H04W 72/542
11,617,212 B2 * 3/2023 Loehr ............... H04W 74/0833
                                                370/329
(Continued)

FOREIGN PATENT DOCUMENTS

WO    WO-2022019646 A1 *  1/2022  ............ H04W 76/40

OTHER PUBLICATIONS

Ahmadi, *5G NR Architecture, Technology, Implementation, and Operation of 3GPP New Radio Standards*, Academic Press (2019).
(Continued)

*Primary Examiner* — Asad M Nawaz
*Assistant Examiner* — Michael Wayne Maddox
(74) *Attorney, Agent, or Firm* — Volpe Koenig

(57)        ABSTRACT

A wireless transmit receive unit (WTRU) and methods are disclosed for mitigating radar interference with uplink control channels may include receiving configuration information including a set of dedicated physical uplink control channel (PUCCH) resources for scheduling requests (SRs), the set includes first PUCCH resources of an UL BWP, and second PUCCH resources of the UL BWP different from the first PUCCH resources. SRs are sent using the first PUCCH resources while the second PUCCH resources are suspended from use. The WTRU receives signaling from a network to suspend one or more of the first PUCCH resources, and unsuspend one or more of the second PUCCH resources. Thereafter, subsequent SRs are sent using only unsuspended PUCCH resources of the UL BWP and not the suspended PUCCH resources, in response to the received signaling from the network. Additional embodiment are disclosed.

19 Claims, 34 Drawing Sheets

(51) Int. Cl.
*H04W 72/231*          (2023.01)
*H04W 72/541*          (2023.01)

(56)                References Cited

U.S. PATENT DOCUMENTS

| | | | | |
|---|---|---|---|---|
| 12,120,730 | B2 * | 10/2024 | Zhang | H04W 28/0278 |
| 2016/0270095 | A1 * | 9/2016 | Dinan | H04W 28/0236 |
| 2019/0045499 | A1 * | 2/2019 | Huang | H04L 5/0053 |
| 2021/0195581 | A1 * | 6/2021 | Singh | H04W 72/21 |
| 2022/0183079 | A1 * | 6/2022 | Ouchi | H04W 74/006 |
| 2022/0317241 | A1 * | 10/2022 | Aduru | H04W 16/14 |
| 2023/0102290 | A1 * | 3/2023 | Babaei | H04L 5/0098 |
| | | | | 370/329 |
| 2023/0262697 | A1 * | 8/2023 | Kim | H04L 5/0055 |
| | | | | 370/329 |
| 2023/0362939 | A1 * | 11/2023 | Lidian | H04L 5/006 |
| 2024/0250739 | A1 * | 7/2024 | Yuan | H04B 7/0695 |

OTHER PUBLICATIONS

Dahlman et al., *5G NR The Next Generation Wireless Access Technology*, Academic Press (2021).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

Third Generation Partnership Project, "Technical Specification Group Radio Access Network; NR; User Equipment (UE) radio transmission and reception; Part 1: Range 1 Standalone (Release 17)," 3GPP TS 38.101-1 V17.5.0 (Mar. 2022).

Third Generation Partnership Project, "Technical Specification Group Radio Access Network; NR; User Equipment (UE) radio transmission and reception; Part 1: Range 1 Standalone (Release 18)," 3GPP TS 38.101-1 V18.1.0 (Mar. 2023).

Third Generation Partnership Project, "Technical Specification Group Radio Access Network; NR; User Equipment (UE) radio transmission and reception; Part 1: Range 1 Standalone (Release 17)," 3GPP TS 38.101-1 V17.9.0 (Mar. 2023).

Third Generation Partnership Project, "Technical Specification Group Radio Access Network; NR; User Equipment (UE) radio transmission and reception; Part 2: Range 2 Standalone (Release 17)," 3GPP TS 38.101-2 V17.5.0 (Mar. 2022).

Third Generation Partnership Project, "Technical Specification Group Radio Access Network; NR; User Equipment (UE) radio transmission and reception; Part 2: Range 2 Standalone (Release 17)," 3GPP TS 38.101-2 V17.9.0 (Mar. 2023).

Third Generation Partnership Project, "Technical Specification Group Radio Access Network; NR; User Equipment (UE) radio transmission and reception; Part 2: Range 2 Standalone (Release 18)," 3GPP TS 38.101-2 V18.1.0 (Mar. 2023).

Third Generation Partnership Project, "Technical Specification Group Radio Access Network; NR; User Equipment (UE) radio transmission and reception; Part 3: Range 1 and Range 2 Interworking operation with other radios (Release 17)," 3GPP TS 38.101-3 V17.5.0 (Mar. 2022).

Third Generation Partnership Project, "Technical Specification Group Radio Access Network; NR; User Equipment (UE) radio transmission and reception; Part 3: Range 1 and Range 2 Interworking operation with other radios (Release 17)," 3GPP TS 38.101-3 V17.9.0 (Mar. 2023).

Third Generation Partnership Project, "Technical Specification Group Radio Access Network; NR; User Equipment (UE) radio transmission and reception; Part 3: Range 1 and Range 2 Interworking operation with other radios (Release 18)," 3GPP TS 38.101-3 V18.1.0 (Mar. 2023).

* cited by examiner

Figure 1C:
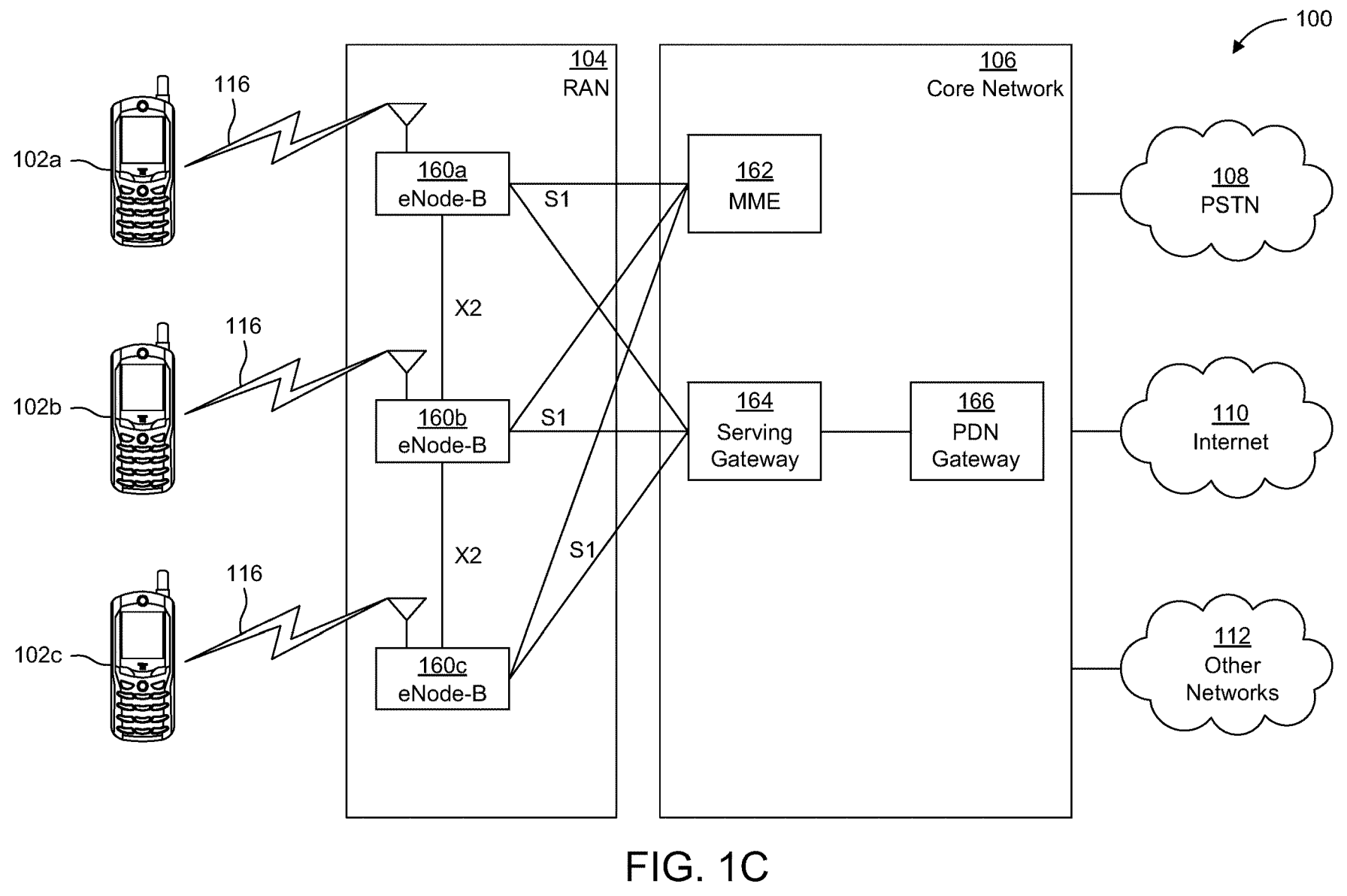

100

108
PSTN

110
Internet

112
Other Networks

106
Core Network

166
PDN Gateway

162
MME

164
Serving Gateway

104
RAN

S1

S1

S1

160a
eNode-B 160b
eNode-B 160c
eNode-B

```
UplinkConfigCommonSIB ::=          SEQUENCE {
    frequencyInfoUL                    FrequencyInfoUL-SIB,
    initialUplinkBWP                   BWP-UplinkCommon,
    timeAlignmentTimerCommon           TimeAlignmentTimer
}

BWP-UplinkCommon ::=               SEQUENCE {
    genericParameters                  BWP,
    rach-ConfigCommon                  SetupRelease { RACH-ConfigCommon },
    pusch-ConfigCommon                 SetupRelease { PUSCH-ConfigCommon },
    pucch-ConfigCommon                 SetupRelease { PUCCH-ConfigCommon }
    ...,
    [[ rach-ConfigCommonIAB-r16           SetupRelease { RACH-ConfigCommon },
    useInterlacePUCCH-PUSCH-r16        ENUMERATED {enabled},
    msgA-ConfigCommon-r16              SetupRelease { MsgA-ConfigCommon-r16 }
    ]]
}
```

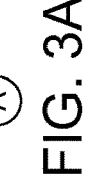

FIG. 3A

Common PUCCH Resource Configuration

320

```
BWP-UplinkDedicated ::=        SEQUENCE {
pucch-Config                       SetupRelease { PUCCH-Config }
pusch-Config                       SetupRelease { PUSCH-Config }
configuredGrantConfig              SetupRelease { ConfiguredGrantConfig }
srs-Config                         SetupRelease { SRS-Config }
beamFailureRecoveryConfig          SetupRelease { BeamFailureRecoveryConfig }
...
[[
pucch-ConfigurationList-r16        SetupRelease { PUCCH-ConfigurationList-r16 }

PUCCH-Config ::=               SEQUENCE {
resourceSetToAddModList            SEQUENCE (SIZE (1..maxNrofPUCCH-ResourceSets)) OF
PUCCHResourceSet
resourceSetToReleaseList           SEQUENCE (SIZE (1..maxNrofPUCCH-ResourceSets)) OF
PUCCHResourceSetId
resourceToAddModList               SEQUENCE (SIZE (1..maxNrofPUCCH-Resources)) OF PUCCH-Resource
resourceToReleaseList              SEQUENCE (SIZE (1..maxNrofPUCCH-Resources)) OF PUCCH-ResourceId
format1                            SetupRelease { PUCCH-FormatConfig }
format2                            SetupRelease { PUCCH-FormatConfig }
format3                            SetupRelease { PUCCH-FormatConfig }
format4                            SetupRelease { PUCCH-FormatConfig }
schedulingRequestResourceToAddModList  SEQUENCE (SIZE (1..maxNrofSR-Resources)) OF
SchedulingRequestResourceConfig
schedulingRequestResourceToReleaseList SEQUENCE (SIZE (1..maxNrofSR-Resources)) OF
SchedulingRequestResourceId
pucch-PowerControl                 PUCCH-PowerControl
...
[[
```

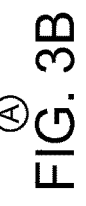

FIG. 3B

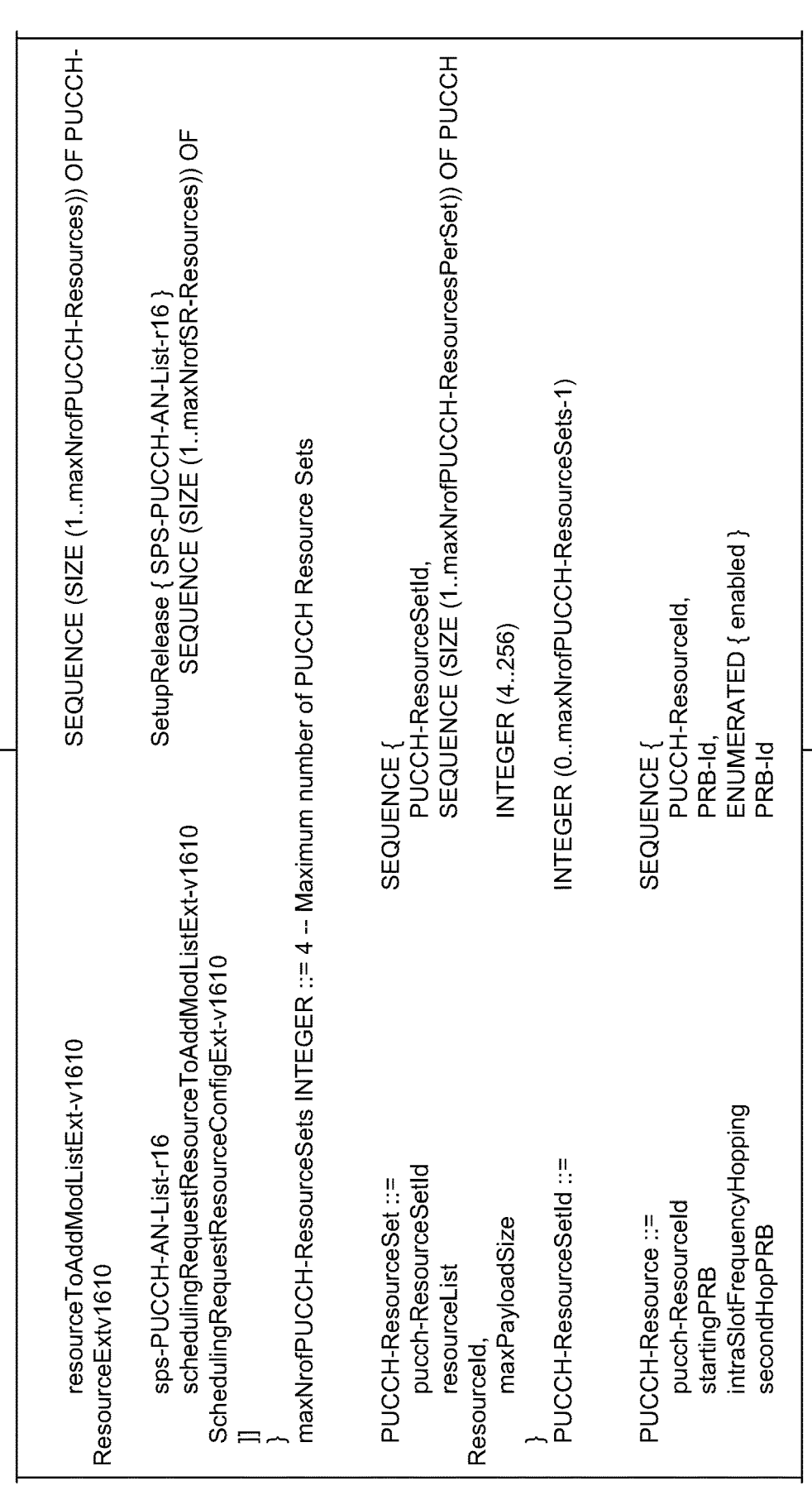

```
resourceToAddModListExt-v1610              SEQUENCE (SIZE (1..maxNrofPUCCH-Resources)) OF PUCCH-
ResourceExtv1610 sps-PUCCH-AN-List-r16                     SetupRelease { SPS-PUCCH-AN-List-r16 }
  schedulingRequestResourceToAddModListExt-v1610    SEQUENCE (SIZE (1..maxNrofSR-Resources)) OF
SchedulingRequestResourceConfigExt-v1610
  ]]
} maxNrofPUCCH-ResourceSets INTEGER ::= 4 -- Maximum number of PUCCH Resource Sets PUCCH-ResourceSet ::=       SEQUENCE {
  pucch-ResourceSetId          PUCCH-ResourceSetId,
  resourceList                 SEQUENCE (SIZE (1..maxNrofPUCCH-ResourcesPerSet)) OF PUCCH
ResourceId,
  maxPayloadSize               INTEGER (4..256)
}
PUCCH-ResourceSetId ::=     INTEGER (0..maxNrofPUCCH-ResourceSets-1)

PUCCH-Resource ::=          SEQUENCE {
  pucch-ResourceId             PUCCH-ResourceId,
  startingPRB                  PRB-Id,
  intraSlotFrequencyHopping    ENUMERATED { enabled }
  secondHopPRB                 PRB-Id
```

FIG. 3B (Continued)

```
format                            CHOICE {
    format0                           PUCCH-format0,
    format1                           PUCCH-format1,
    format2                           PUCCH-format2,
    format3                           PUCCH-format3,
    format4                           PUCCH-format4

PUCCH-ResourceId ::=              INTEGER (0..maxNrofPUCCH-Resources-1)
maxNrofPUCCH-Resources INTEGER ::= 128
maxNrofPUCCH-ResourcesPerSet INTEGER ::= 32 -- Maximum number of PUCCH Resources per PUCCH-ResourceSet
```

Dedicated PUCCH Resource Configuration

330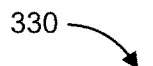

```
PUCCH-format0 ::=                    SEQUENCE {
    initialCyclicShift                   INTEGER(0..11),
    nrofSymbols                          INTEGER (1..2),
    startingSymbolIndex                  INTEGER(0..13)
}
PUCCH-format1 ::=                    SEQUENCE {
    initialCyclicShift                   INTEGER(0..11),
    nrofSymbols                          INTEGER (4..14),
    startingSymbolIndex                  INTEGER(0..10),
    timeDomainOCC                        INTEGER(0..6)
}
PUCCH-format2 ::=                    SEQUENCE {
    nrofPRBs                             INTEGER (1..16),
    nrofSymbols                          INTEGER (1..2),
    startingSymbolIndex                  INTEGER(0..13)
}
PUCCH-format3 ::=                    SEQUENCE {
    nrofPRBs                             INTEGER (1..16),
    nrofSymbols                          INTEGER (4..14),
    startingSymbolIndex                  INTEGER(0..10)
}
PUCCH-format4 ::=                    SEQUENCE {
    nrofSymbols                          INTEGER (4..14),
    occ-Lengt                            ENUMERATED {n2, n4},
    occ-Index                            ENUMERATED {n0, n1, n2, n3},
    startingSymbolIndex                  INTEGER(0..10)
}
```

PUCCH Format Configuration

FIG. 3C

340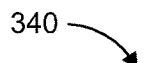

```
SPS-PUCCH-AN-List-r16 ::=        SEQUENCE (SIZE(1..4)) OF SPS-PUCCH-AN-r16

SPS-PUCCH-AN-r16 ::=            SEQUENCE {
    sps-PUCCH-AN-ResourceID-r16      PUCCH-ResourceId,
    maxPayloadSize-r16               INTEGER (4..256) OPTIONAL -- Need R
}
```

SPS-PUCCH-AN-list

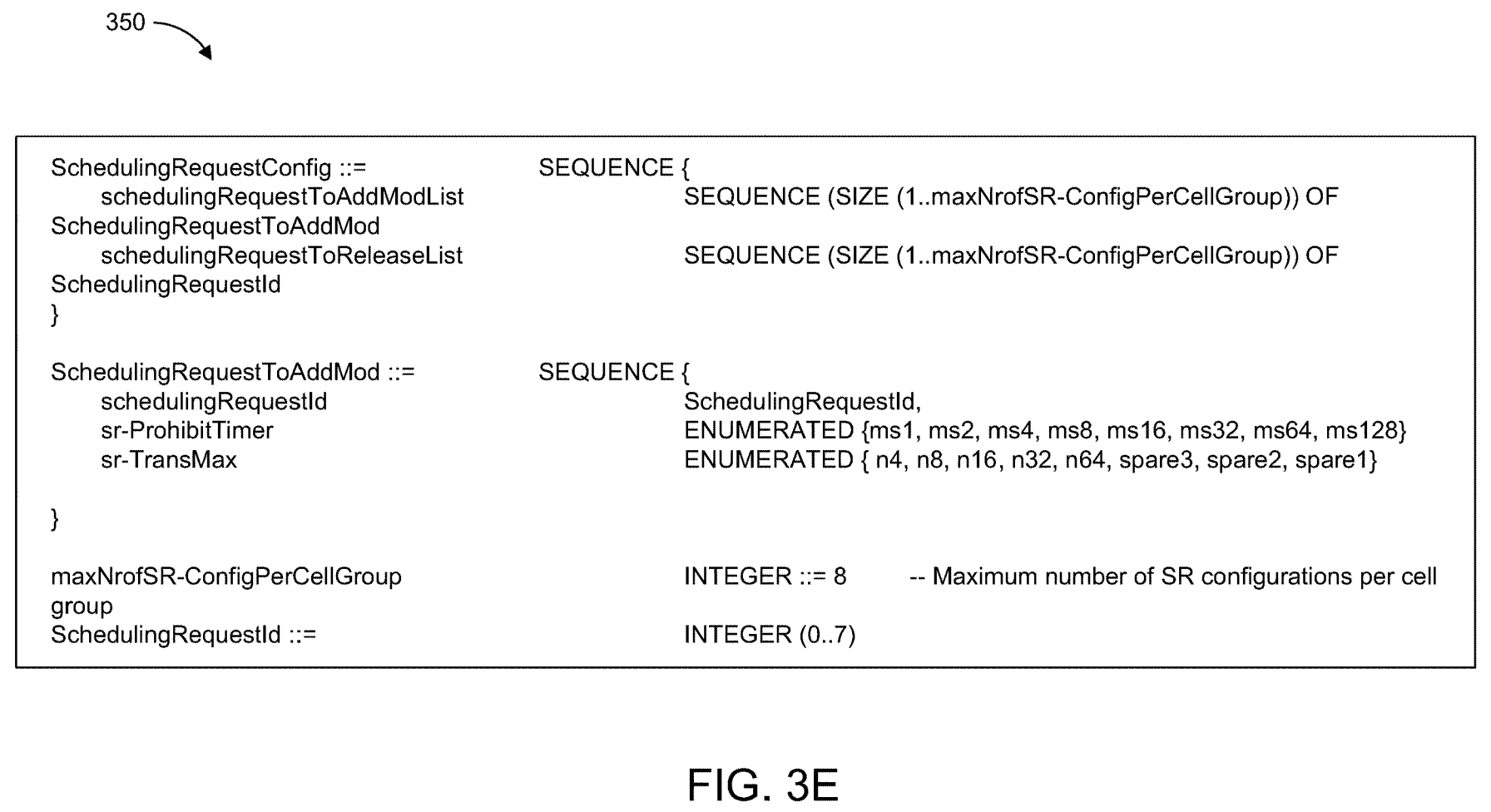

```
SchedulingRequestConfig ::=          SEQUENCE {
    schedulingRequestToAddModList        SEQUENCE (SIZE (1..maxNrofSR-ConfigPerCellGroup)) OF
    SchedulingRequestToAddMod
    schedulingRequestToReleaseList       SEQUENCE (SIZE (1..maxNrofSR-ConfigPerCellGroup)) OF
    SchedulingRequestId
}

SchedulingRequestToAddMod ::=        SEQUENCE {
    schedulingRequestId                  SchedulingRequestId,
    sr-ProhibitTimer                     ENUMERATED {ms1, ms2, ms4, ms8, ms16, ms32, ms64, ms128}
    sr-TransMax                          ENUMERATED { n4, n8, n16, n32, n64, spare3, spare2, spare1}
} maxNrofSR-ConfigPerCellGroup         INTEGER ::= 8        -- Maximum number of SR configurations per cell
group
SchedulingRequestId ::=              INTEGER (0..7)
```

FIG. 3E

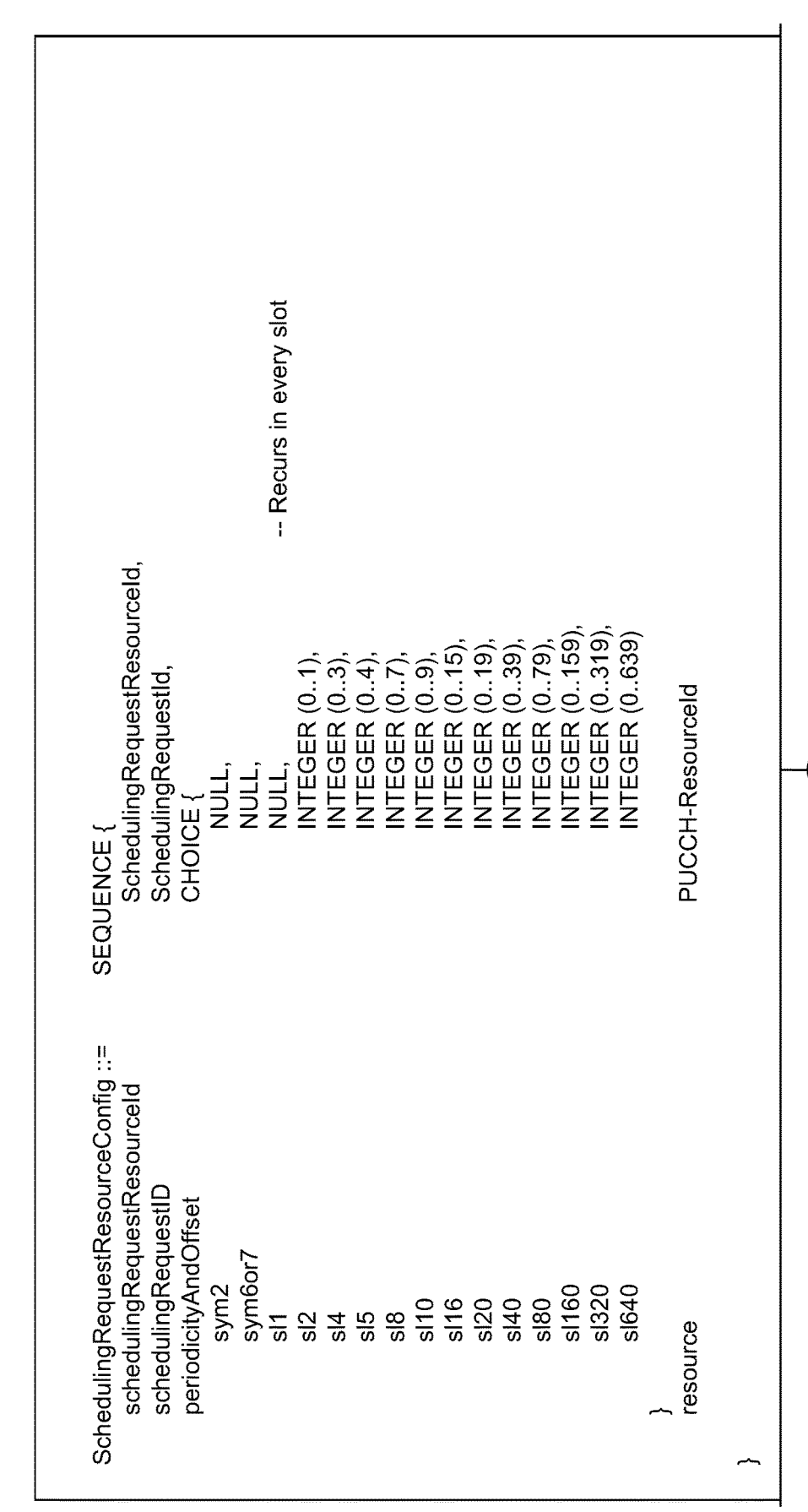

```
SchedulingRequestResourceConfig ::=   SEQUENCE {
schedulingRequestResourceId           SchedulingRequestResourceId,
schedulingRequestID                   SchedulingRequestId,
periodicityAndOffset                  CHOICE {
    sym2                                  NULL,
    sym6or7                               NULL,
    sl1                                   NULL,         -- Recurs in every slot
    sl2                                   INTEGER (0..1),
    sl4                                   INTEGER (0..3),
    sl5                                   INTEGER (0..4),
    sl8                                   INTEGER (0..7),
    sl10                                  INTEGER (0..9),
    sl16                                  INTEGER (0..15),
    sl20                                  INTEGER (0..19),
    sl40                                  INTEGER (0..39),
    sl80                                  INTEGER (0..79),
    sl160                                 INTEGER (0..159),
    sl320                                 INTEGER (0..319),
    sl640                                 INTEGER (0..639)
}
resource                              PUCCH-ResourceId
}
```

```
SchedulingRequestResourceConfigExt-v1610 ::=    SEQUENCE {
    phy-PriorityIndex-r16                        ENUMERATED {p0, p1}
    ...
}

SchedulingRequestResourceId ::=                  INTEGER (1..maxNrofSR-Resources)

maxNrofSR-Resources                              INTEGER ::= 8 -- Maximum number of SR resources per BWP in a
cell.
```

Scheduling Request Configuration

FIG. 3E (Continued)

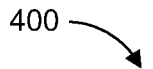
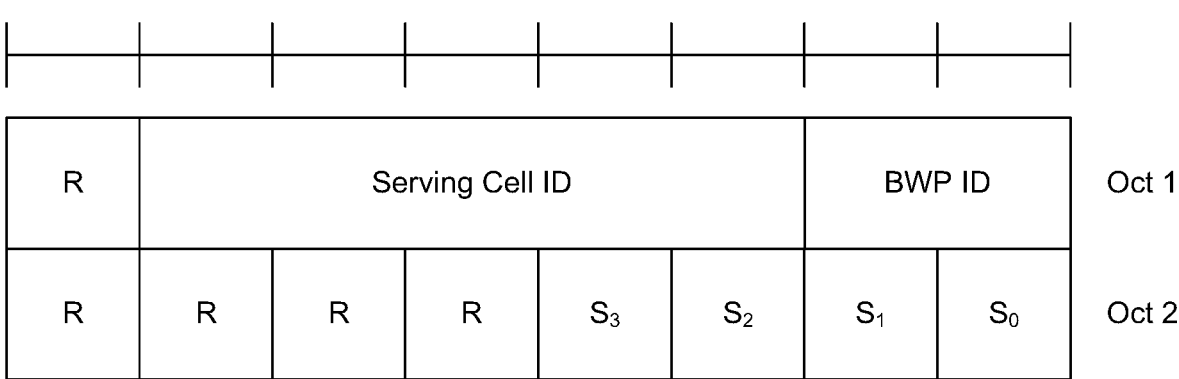
PUCCH Semi-Persistent Activation/Deactivation
FIG. 4

```
CSI-ReportConfig ::=              SEQUENCE {
reportConfigId                    CSI-ReportConfigId,
carrier                           ServCellIndex
resourcesForChannelMeasurement    CSI-ResourceConfigId,
csi-IM-ResourcesForInterference   CSI-ResourceConfigId
nzp-CSI-RS-ResourcesForInterference   CSI-ResourceConfigId
reportConfigType                  CHOICE {
    periodic                      SEQUENCE {
        reportSlotConfig              CSI-ReportPeriodicityAndOffset,
        pucch-CSI-ResourceList        SEQUENCE (SIZE (1..maxNrofBWPs)) OF PUCCH-CSI-Resource
    },
    semiPersistentOnPUCCH         SEQUENCE {
        reportSlotConfig              CSI-ReportPeriodicityAndOffset,
        pucch-CSI-ResourceList        SEQUENCE (SIZE (1..maxNrofBWPs)) OF PUCCH-CSI-Resource
    },
    semiPersistentOnPUSCH         SEQUENCE {
        reportSlotConfig              ENUMERATED {sl5, sl10, sl20, sl40, sl80, sl160, sl320},
        reportSlotOffsetList          SEQUENCE (SIZE (1..maxNrofUL-Allocations)) OF INTEGER(0..32)
        p0alpha                       P0-PUSCH-AlphaSetId
    },
    aperiodic                     SEQUENCE {
        reportSlotOffsetList          SEQUENCE (SIZE (1..maxNrofUL-Allocations)) OF INTEGER(0..32)
```

subbands12     BIT STRING(SIZE(12)),
subbands13     BIT STRING(SIZE(13)),
subbands14     BIT STRING(SIZE(14)),
subbands15     BIT STRING(SIZE(15)),
subbands16     BIT STRING(SIZE(16)),
subbands17     BIT STRING(SIZE(17)),
subbands18     BIT STRING(SIZE(18)),
...,
subbands19-v1530     BIT STRING(SIZE(19))
}

CSI Report Configuration

```
timeRestrictionForChannelMeasurements        ENUMERATED {configured, notConfigured},
timeRestrictionForInterferenceMeasurements        ENUMERATED {configured, notConfigured},
codebookConfig                                     CodebookConfig
dummy                                              ENUMERATED {n1, n2}
groupBasedBeamReporting                     CHOICE {
    enabled                                          NULL,
    disabled                                         SEQUENCE {
        nrofReportedRS                                 ENUMERATED {n1, n2, n3, n4}
    }
},
cqi-Table                                   ENUMERATED {table1, table2, table3, spare1}
subbandSize                                 ENUMERATED {value1, value2},
non-PMI-PortIndication                      SEQUENCE (SIZE (1..maxNrofNZP-CSI-RS-ResourcesPerConfig)) OF
PortIndexFor8Ranks
...,
[[
semiPersistentOnPUSCH-v1530                 SEQUENCE {
    reportSlotConfig-v1530                        ENUMERATED {sl4, sl8, sl16}
}
]],
[[
```

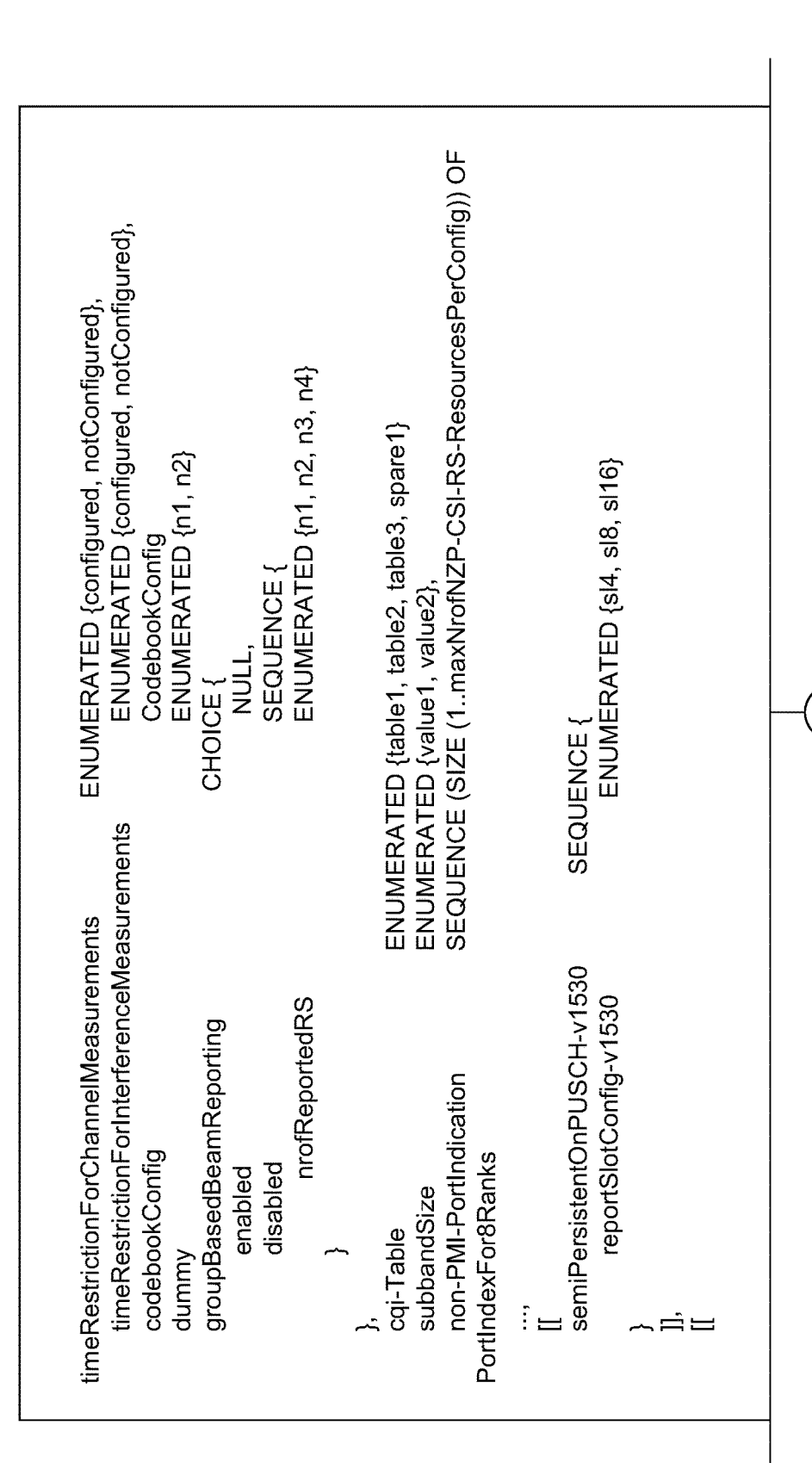

```
semiPersistentOnPUSCH-v1610    SEQUENCE {
    reportSlotOffsetListDCI-0-2-r16    SEQUENCE (SIZE (1.. maxNrofUL-Allocations-r16)) OF
INTEGER(0..32)
    reportSlotOffsetListDCI-0-1-r16    SEQUENCE (SIZE (1.. maxNrofUL-Allocations-r16)) OF
INTEGER(0..32)
}
aperiodic-v1610    SEQUENCE {
    reportSlotOffsetListDCI-0-2-r16    SEQUENCE (SIZE (1.. maxNrofUL-Allocations-r16)) OF
INTEGER(0..32)
    reportSlotOffsetListDCI-0-1-r16    SEQUENCE (SIZE (1.. maxNrofUL-Allocations-r16)) OF
INTEGER(0..32)
}
reportQuantity-r16    CHOICE {
    cri-SINR-r16    NULL,
    ssb-Index-SINR-r16    NULL
}
codebookConfig-r16    CodebookConfig-r16
]]
}

CSI-ReportPeriodicityAndOffset ::=    CHOICE {
```

(B)

FIG. 5B (Contnued)

```
                                          B slots4                          INTEGER(0..3),
slots5                          INTEGER(0..4),
slots8                          INTEGER(0..7),
slots10                         INTEGER(0..9),
slots16                         INTEGER(0..15),
slots20                         INTEGER(0..19),
slots40                         INTEGER(0..39),
slots80                         INTEGER(0..79),
Slots160                        INTEGER(0...159),
Slots320                        INTEGER(0..319)
}

PUCCH-CSI-Resource ::=          SEQUENCE {
uplinkBandwidthPartId             BWP-Id,
pucch-Resource                    PUCCH-Resource
                                PUCCH-ResourceId CSI Report Configuration (Con't)
```

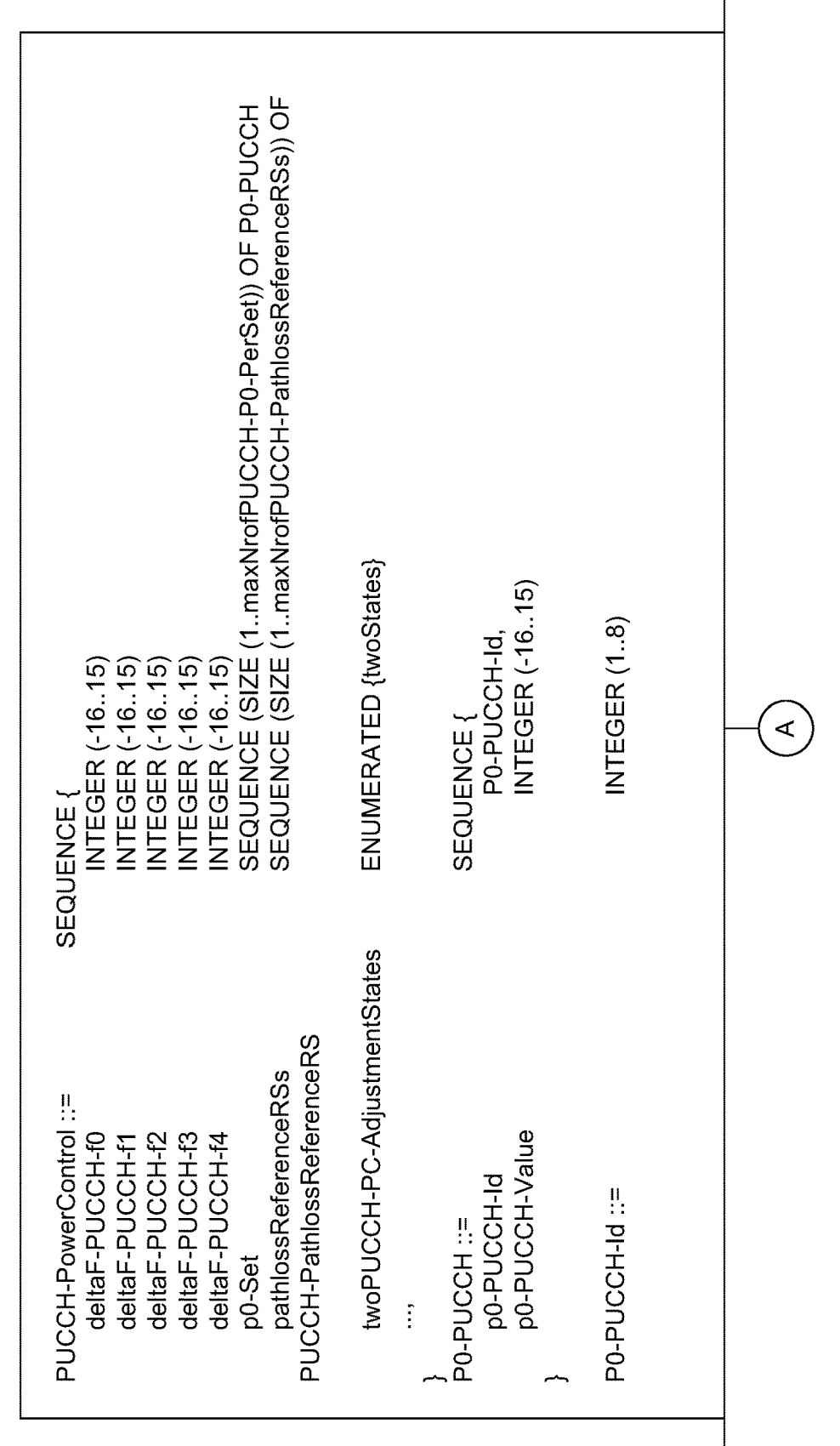

```
PUCCH-PowerControl ::=        SEQUENCE {
    deltaF-PUCCH-f0               INTEGER (-16..15)
    deltaF-PUCCH-f1               INTEGER (-16..15)
    deltaF-PUCCH-f2               INTEGER (-16..15)
    deltaF-PUCCH-f3               INTEGER (-16..15)
    deltaF-PUCCH-f4               INTEGER (-16..15)
    p0-Set                        SEQUENCE (SIZE (1..maxNrofPUCCH-P0-PerSet)) OF P0-PUCCH
    pathlossReferenceRSs          SEQUENCE (SIZE (1..maxNrofPUCCH-PathlossReferenceRSs)) OF
PUCCH-PathlossReferenceRS twoPUCCH-PC-AdjustmentStates  ENUMERATED {twoStates}

...,

}
P0-PUCCH ::=                  SEQUENCE {
    p0-PUCCH-Id                   P0-PUCCH-Id,
    p0-PUCCH-Value                INTEGER (-16..15)
}

P0-PUCCH-Id ::=               INTEGER (1..8)
```

```
PUCCH-PathlossReferenceRS ::=    SEQUENCE {
pucch-PathlossReferenceRS-Id        PUCCH-PathlossReferenceRS-Id,
referenceSignal                     CHOICE {
    ssb-Index                           SSB-Index,
    csi-RS-Index                        NZP-CSI-RS-ResourceId
    }
} maxNrofPUCCH-P0-PerSet INTEGER ::= 8 -- Maximum number of P0-pucch present in a p0-pucch set
```

PUCCH Power Control Configuration

```
PUCCH-Resource ::=                          SEQUENCE {
        pucch-ResourceId                            PUCCH-ResourceId,
        startingPRB                                 PRB-Id,
        intraSlotFrequencyHopping                   ENUMERATED { enabled }
        secondHopPRB                                PRB-Id
        format                                      CHOICE {
                format0                                     PUCCH-format0,
                format1                                     PUCCH-format1,
                format2                                     PUCCH-format2,
                format3                                     PUCCH-format3,
                format4                                     PUCCH-format4
        }
}
```

PUCCH Resource Dynamic Configuration

Figure 10B:
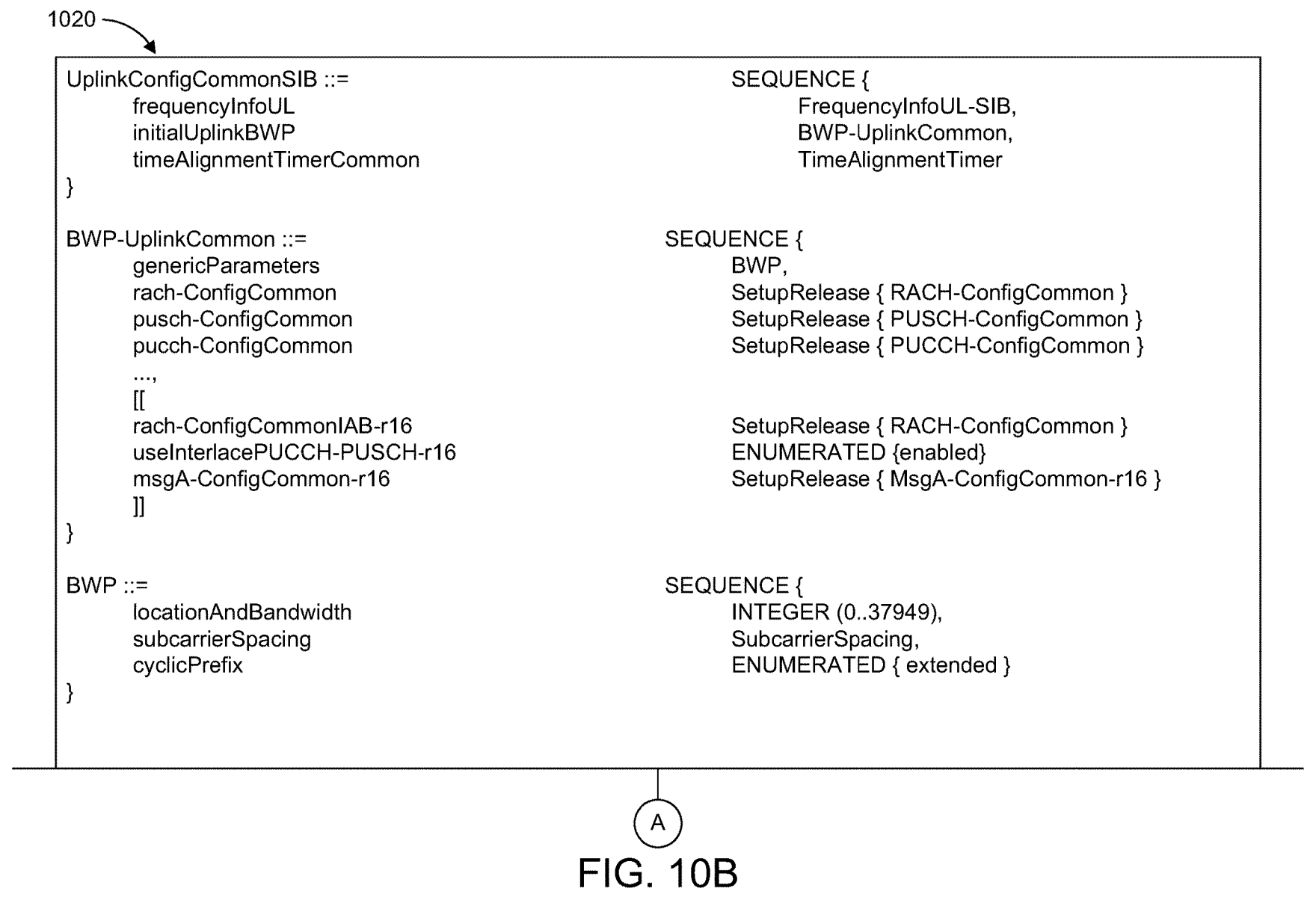

1020

```
UplinkConfigCommonSIB ::=        SEQUENCE {
    frequencyInfoUL                  FrequencyInfoUL-SIB,
    initialUplinkBWP                 BWP-UplinkCommon,
    timeAlignmentTimerCommon         TimeAlignmentTimer
}

BWP-UplinkCommon ::=             SEQUENCE {
    genericParameters               BWP,
    rach-ConfigCommon               SetupRelease { RACH-ConfigCommon }
    pusch-ConfigCommon              SetupRelease { PUSCH-ConfigCommon }
    pucch-ConfigCommon              SetupRelease { PUCCH-ConfigCommon }
    ...,
    [[
    rach-ConfigCommonIAB-r16        SetupRelease { RACH-ConfigCommon }
    useInterlacePUCCH-PUSCH-r16     ENUMERATED {enabled}
    msgA-ConfigCommon-r16           SetupRelease { MsgA-ConfigCommon-r16 }
    ]]
}

BWP ::=                         SEQUENCE {
    locationAndBandwidth            INTEGER (0..37949),
    subcarrierSpacing               SubcarrierSpacing,
    cyclicPrefix                    ENUMERATED { extended }
}
```

```
PUCCH-ConfigCommon ::=        SEQUENCE {
pucch-ResourceCommon              INTEGER (0..15)
pucch-GroupHopping                ENUMERATED { neither, enable, disable },
hoppingId                         INTEGER (0..1023)
p0-nominal                        INTEGER (-202..24)
...
}
```

Updated Common PUCCH Resource Configuration

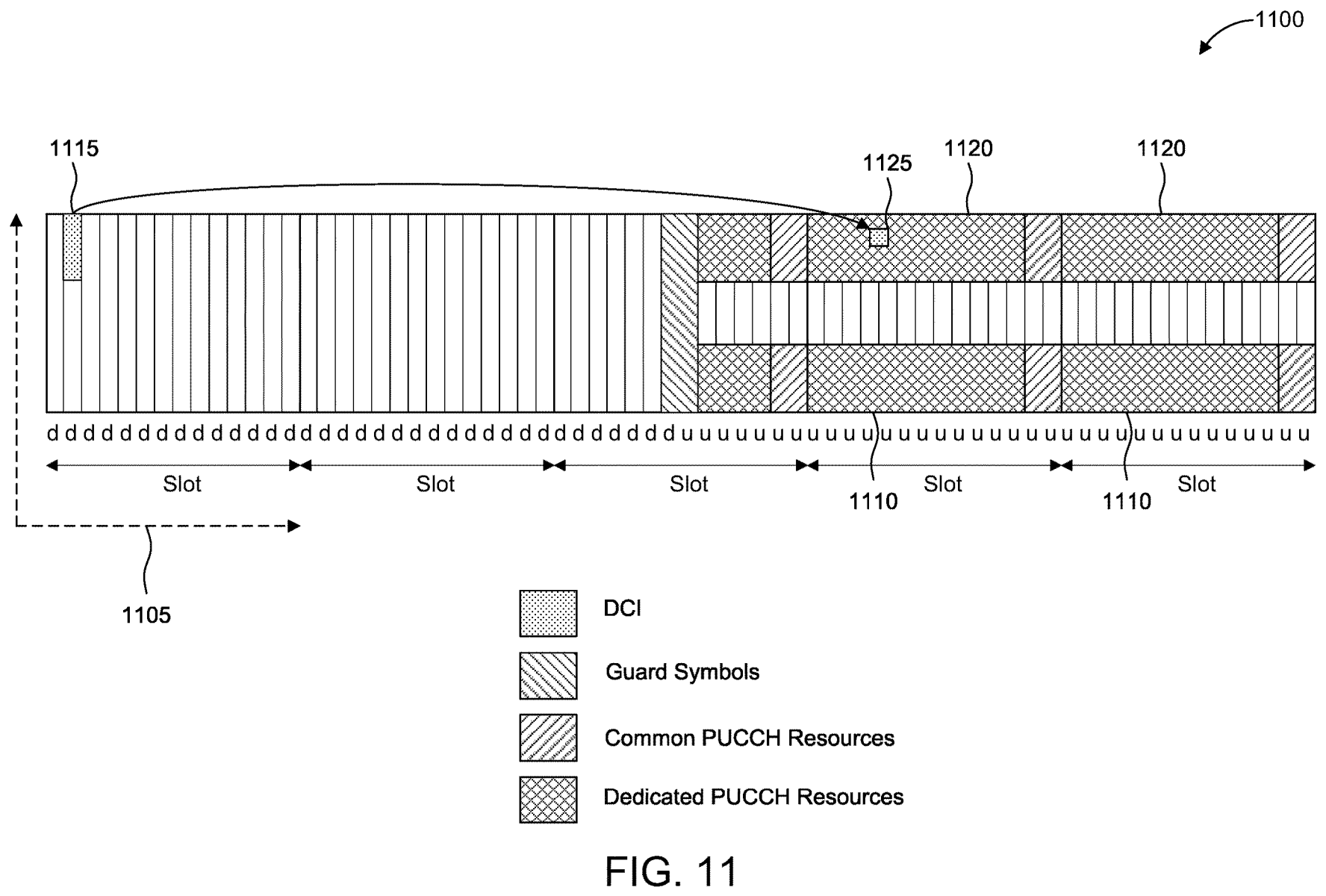

Slot

Slot

Slot

Slot

Slot

Slot

1115

1105

DCI

Guard Symbols

Common PUCCH Resources

Dedicated PUCCH Resources

FIG. 11

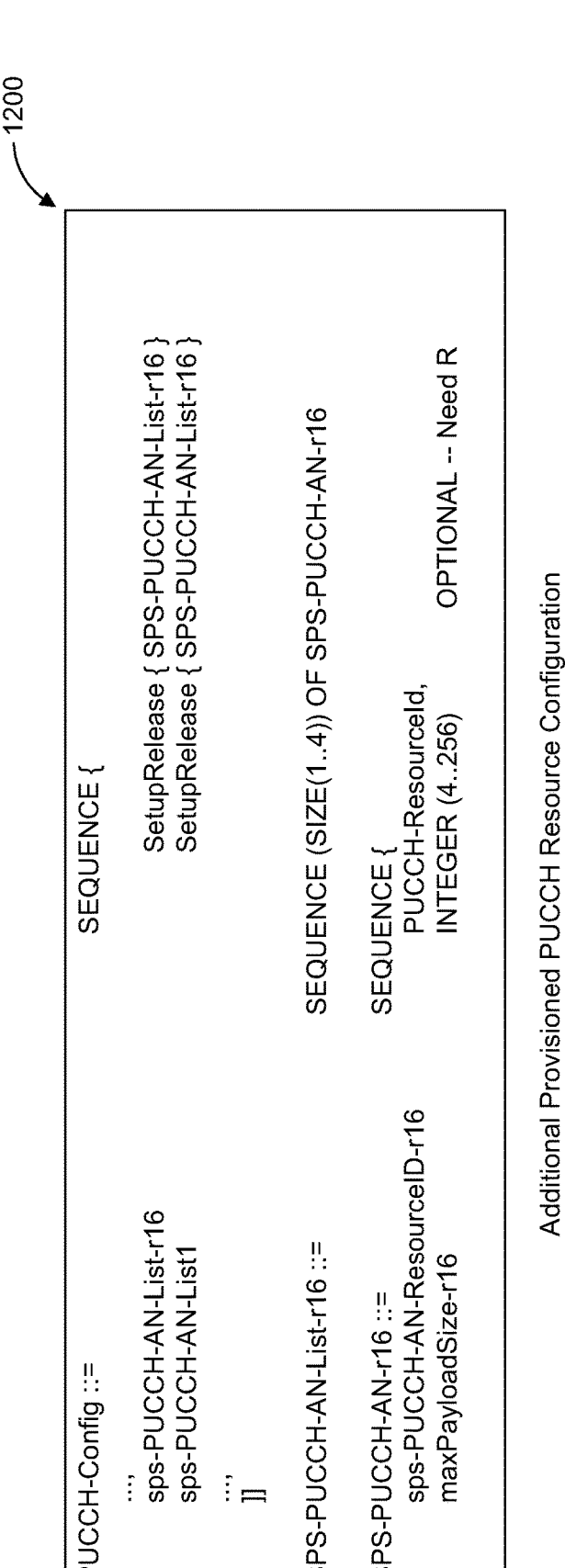

```
PUCCH-Config ::=                SEQUENCE {
    ...,
    sps-PUCCH-AN-List-r16           SetupRelease { SPS-PUCCH-AN-List-r16 }
    sps-PUCCH-AN-List1              SetupRelease { SPS-PUCCH-AN-List-r16 }
    ...,
    ]]

SPS-PUCCH-AN-List-r16 ::=      SEQUENCE (SIZE(1..4)) OF SPS-PUCCH-AN-r16

SPS-PUCCH-AN-r16 ::=           SEQUENCE {
    sps-PUCCH-AN-ResourceID-r16       PUCCH-ResourceId,
    maxPayloadSize-r16                INTEGER (4..256)          OPTIONAL -- Need R
}
```

Additional Provisioned PUCCH Resource Configuration

FIG. 12

```
SchedulingRequestResourceId ::=     INTEGER (1..maxNrofSR-Resources)

maxNrofSR-Resources                 INTEGER ::= 8     -- Maximum number of SR resources
per BWP in a cell.
```

Scheduling Request (SR) Resource Modification

FIG. 13

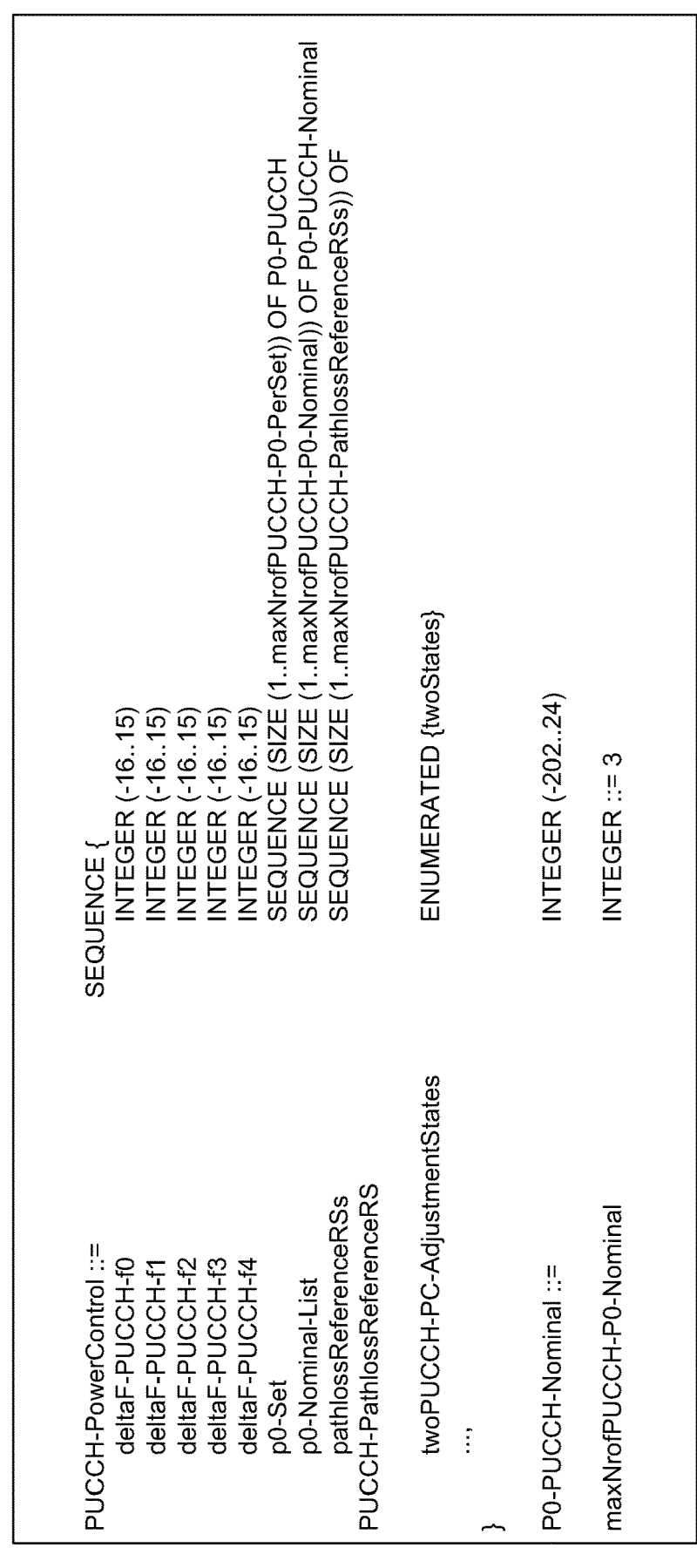

```
PUCCH-PowerControl ::=          SEQUENCE {
    deltaF-PUCCH-f0                 INTEGER (-16..15)
    deltaF-PUCCH-f1                 INTEGER (-16..15)
    deltaF-PUCCH-f2                 INTEGER (-16..15)
    deltaF-PUCCH-f3                 INTEGER (-16..15)
    deltaF-PUCCH-f4                 INTEGER (-16..15)
    p0-Set                          SEQUENCE (SIZE (1..maxNrofPUCCH-P0-PerSet)) OF P0-PUCCH
    p0-Nominal-List                 SEQUENCE (SIZE (1..maxNrofPUCCH-P0-Nominal)) OF P0-PUCCH-Nominal
    pathlossReferenceRSs            SEQUENCE (SIZE (1..maxNrofPUCCH-PathlossReferenceRSs)) OF
PUCCH-PathlossReferenceRS twoPUCCH-PC-AdjustmentStates    ENUMERATED {twoStates}

...

}

P0-PUCCH-Nominal ::=            INTEGER (-202..24)

maxNrofPUCCH-P0-Nominal        INTEGER ::= 3
```

PUCCH Power Control Modification

Measure Characteristics of Proximate
Non-network Transmissions —1505

1510

Characteristics >
Threshold?

No

Yes

1515

Interferer Impact
Common PUCCH
Resources?

Yes

1520

Update SIB1 to Use Alt.
Resources for Common PUCCH

No

1525

Interferer Impact
Dedicated PUCCH
Resources?

No

Yes

Implement Mitigation Embodiment
Relevant to Affected PUCCH Resources —1530

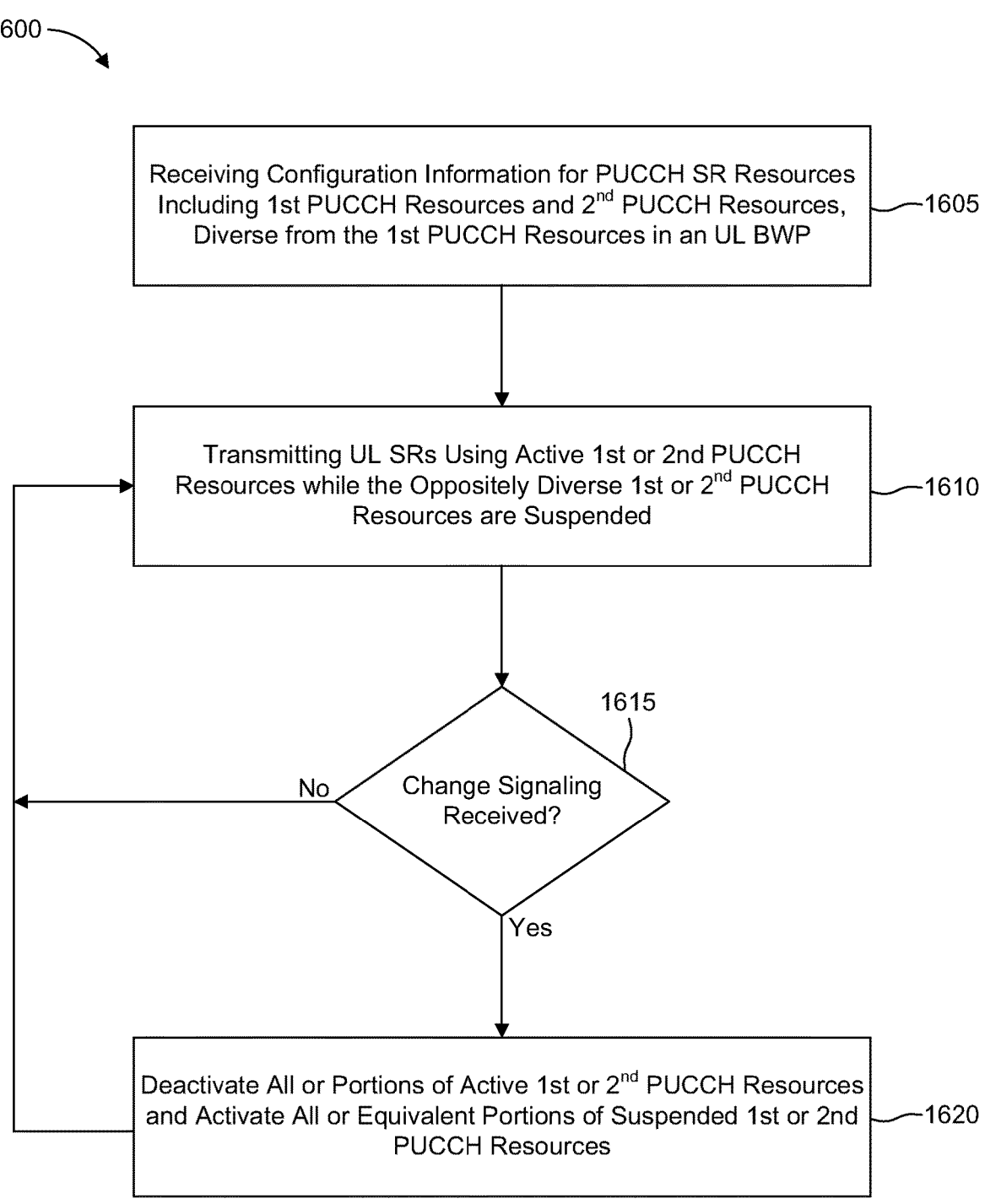

1600

Receiving Configuration Information for PUCCH SR Resources Including 1st PUCCH Resources and 2nd PUCCH Resources, Diverse from the 1st PUCCH Resources in an UL BWP ⎯1605

Transmitting UL SRs Using Active 1st or 2nd PUCCH Resources while the Oppositely Diverse 1st or 2nd PUCCH Resources are Suspended ⎯1610

1615

Change Signaling Received?

No

Yes

Deactivate All or Portions of Active 1st or 2nd PUCCH Resources and Activate All or Equivalent Portions of Suspended 1st or 2nd PUCCH Resources ⎯1620

FIG. 16

PUCCH ENHANCEMENTS FOR RADAR COEXISTENCE

CROSS-REFERENCE TO RELATED APPLICATIONS

This application claims the benefit of U.S. Provisional Application No. 63/336,639, filed Apr. 29, 2022, the contents of which are incorporated herein by reference.

STATEMENT OF GOVERNMENT RIGHTS

This invention was made with government support under project NSC-20-2084: Dynamic Spectrum Sharing 5G networks enhancement prototype, also known as ENhanced SecURity and co-Existence for DoD—5G (ENSURED-5G); OTA Number W15QKN-15-9-1004, Base and Project Agreement 2017-314A-Mod-03, Subcontract 2021-01. The government has certain rights in the invention.

BACKGROUND

Recent trends are driving researchers to create solutions for cellular network deployments in the presence of high-power narrowband interferers (e.g., radars). Although the baseline functionality provided by 5G could be used to provide some level of coexistence with radars, enhancements are needed to realize the full 5G potential.

When a narrow-band high power interferer, such as radar, operates in a band that overlaps with the resource blocks (RBs) used by a wireless transmit receive unit (WTRU) to transmit uplink control signaling, e.g., over a physical uplink control channel (PUCCH) and/or physical uplink shared channel (PUSCH), to a base station, such as a gNB, the gNB would not be able to reliably receive critical uplink control information (UCI). This UCI may include hybrid automatic repeat request (HARQ) acknowledgement or negative acknowledgement (ACK/NACK) for transmitted downlink data, channel state information (CSI) feedback related to the downlink channel conditions for link adaptation/multiple-input multiple-output (MIMO) operation/beam management, and scheduling requests (SRs) that indicate that a WTRU needs uplink resources for data transmission. Even for scenarios where the UCI can be received reliably in the presence of radar interference, there is the potential for the UCI transmission to interfere with the radar system. Therefore, when coexisting with high-power narrowband interferers such as a radar, there is a need for new abilities to ensure that robust and efficient UCI transmission and reception can occur when coexisting with radars.

SUMMARY

Aspects, features and advantages of the disclosed embodiments ensure robust and efficient uplink control information (UCI) transmission and reception can occur when coexisting with radars. According to a first aspect, dynamic reconfiguration of the PUCCH resources may be used to mitigate interference to and from radars (or other interferers). According to a second aspect, diversify PUCCH frequency locations may be used to mitigate interference to and from radars. According to a third aspect, dynamic switching of CSI reporting between the PUCCH and the PUSCH may be utilized to mitigate interference with radars. According to a fourth aspect, power boosting of PUCCH transmissions for WTRUs that will incur interference from radars may be utilized.

A wireless transmit receive unit (WTRU) and methods are disclosed for mitigating radar interference with uplink control channels may include receiving configuration information including a set of dedicated physical uplink control channel (PUCCH) resources for scheduling requests (SRs), the set includes first PUCCH resources of an UL BWP, and second PUCCH resources of the UL BWP different from the first PUCCH resources. SRs are sent using the first PUCCH resources while the second PUCCH resources are suspended from use. The WTRU receives signaling from a network to suspend one or more of the first PUCCH resources, and unsuspend one or more of the second PUCCH resources. Thereafter, subsequent SRs are sent using only unsuspended PUCCH resources of the UL BWP and not the suspended PUCCH resources, in response to the received signaling from the network. Additional embodiment are disclosed.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

FIGS. 3A-3E show example configurations for common and dedicated uplink channels for UCI transmissions;

FIG. 4 shows an example configuration of a physical uplink control channel (PUCCH) semi-persistent activation and deactivation;

FIGS. 10A and 10B are example configurations for respective PUCCH resource dynamic configuration and updated common PUCCH resources according to an embodiment;

FIG. 11 is an example resource diagram showing use of first and second resources of common and dedicated PUCCH resource sets according to an embodiment;

FIG. 12 is an example configuration for additional provisioned PUCCH resources of various embodiments;

FIG. 13 is an example configuration for scheduling request (SR) modification according to an embodiment;

FIG. 14 is an example configuration for PUCCH power control according to an embodiment;

FIG. 16 is a flow diagram showing an example method of PUCCH resource assignment and modification of SRs based on detection of interference according to an embodiment.

DETAILED DESCRIPTION

Figure 1A:
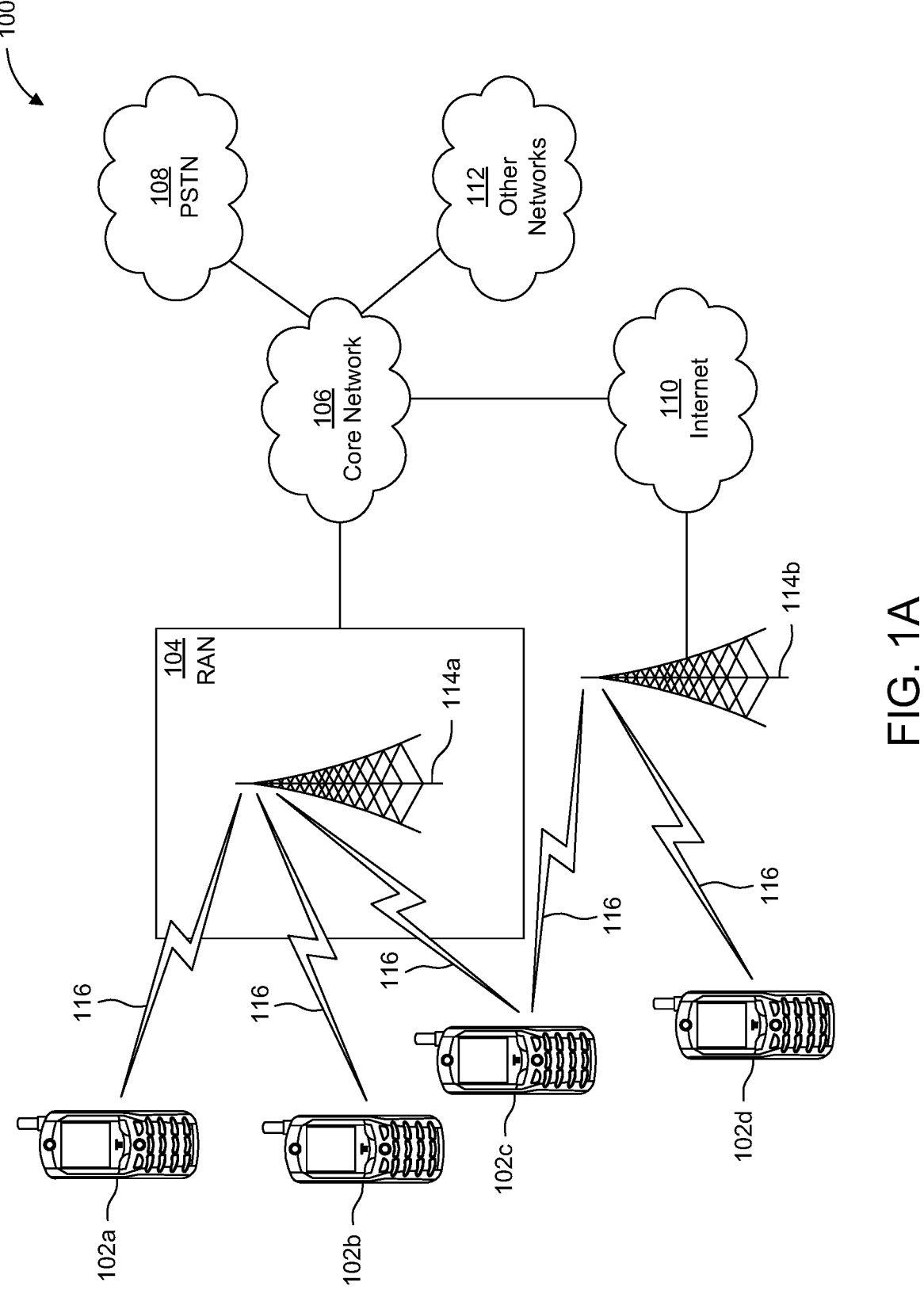
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
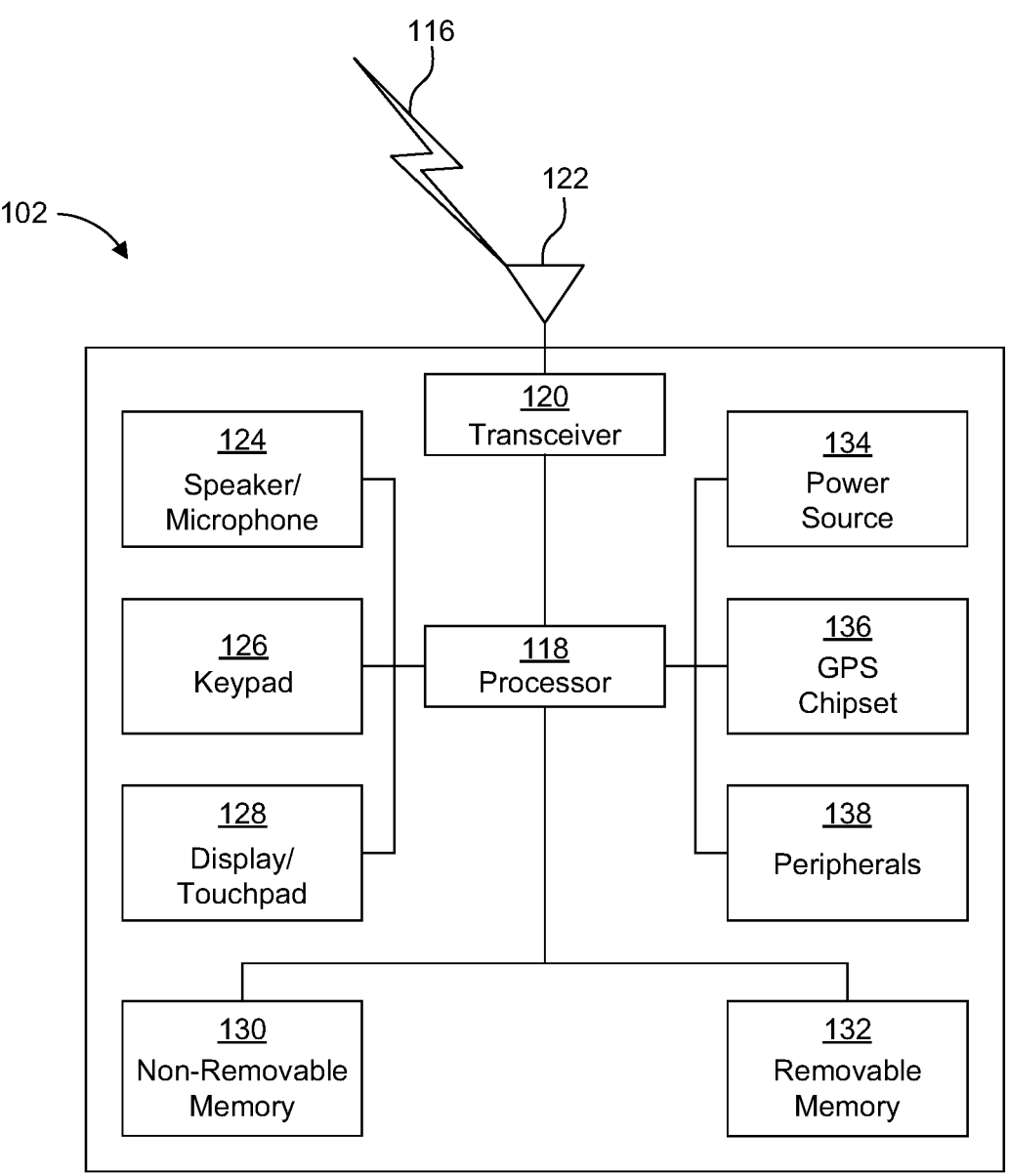
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
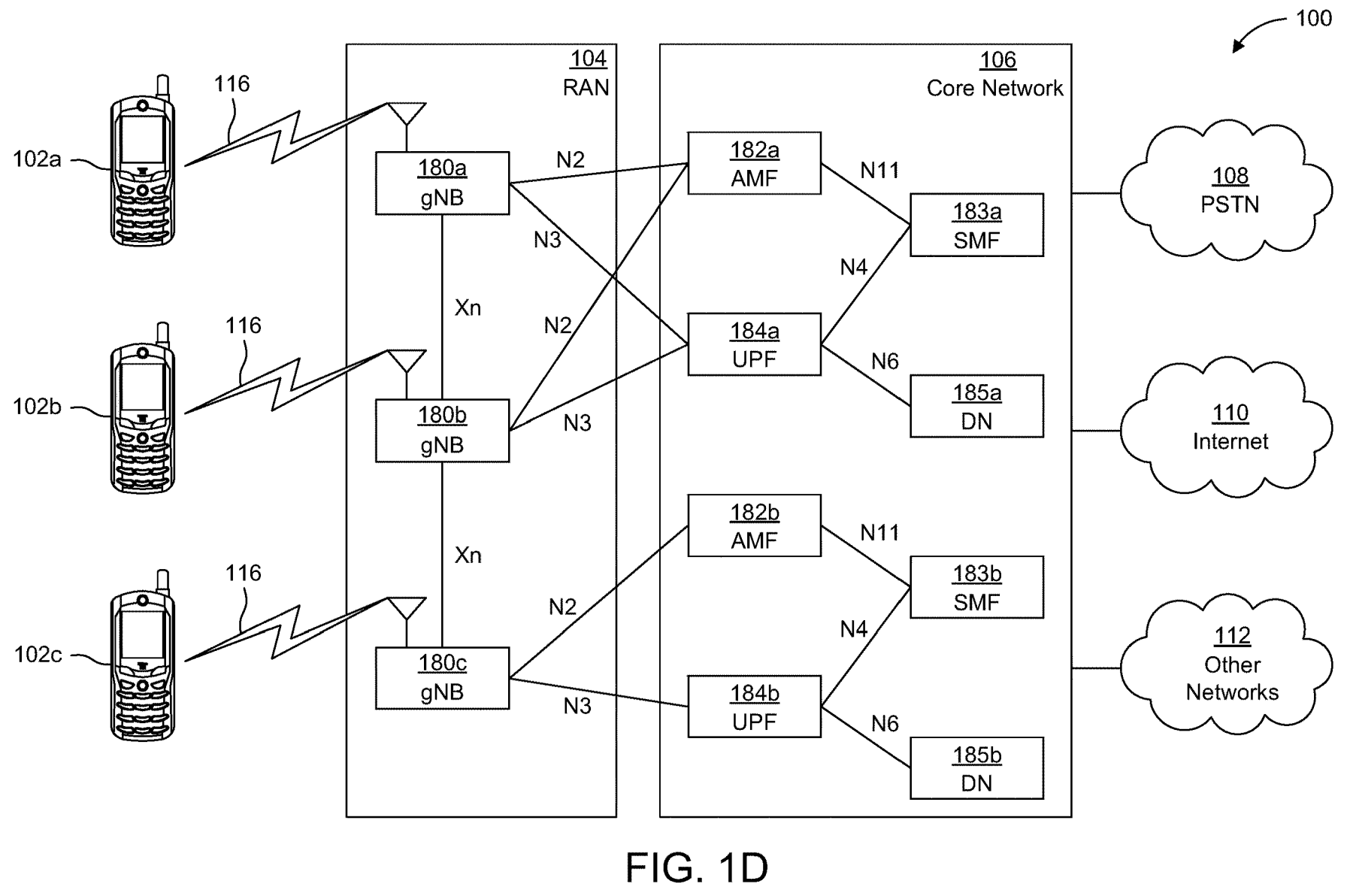

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
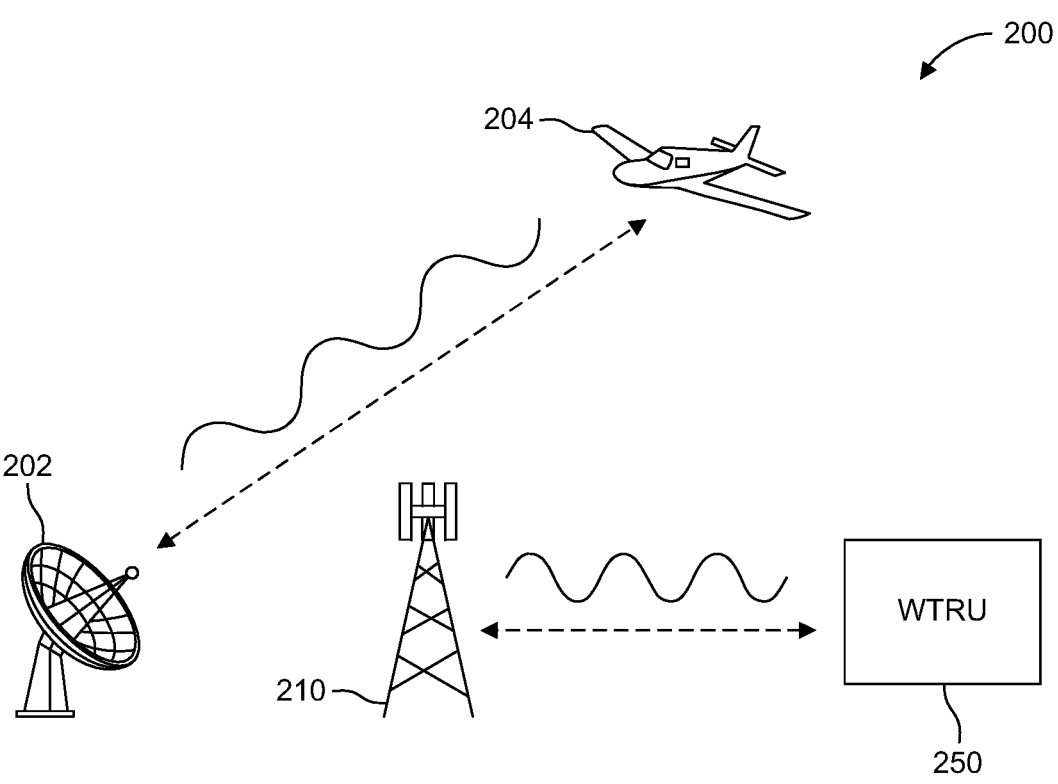
FIG. 2 is a diagram depicting a potential scenario of a wireless network encountering interference from radar.

Referring to FIG. 2, an example potential interference scenario 200 is shown where communications between a base station 210 and a remote WTRU 250 may be adversely impacted by the presence of narrowband interferers, such as radar station 202 and/or radar on plane 204 (or reflections therefrom). The example embodiments that follow, address potential interference avoidance solutions for uplink (UL) communications, i.e., from WTRU 250 to base station 210.

Uplink Control Signaling on PUCCH. The physical uplink control channel (PUCCH) carries the uplink control information (UCI) from WTRUs 250 to the gNB (or base station) 210. Uplink Layer 1/Layer 2 (L1/L2) control signaling may generally include, among other potential information: Hybrid ARQ acknowledgments for received DL- SCH transport blocks; Channel-state information (CSI) related to the downlink channel conditions, used to assist downlink scheduling, including multi-antenna and beam forming schemes; and Scheduling requests (SRs), indicating that a device needs uplink resources for UL-SCH transmission.

The $3^{rd}$ Generation Partnership Program (3GPP) has defined specifications for New Radio (NR) that specifies five PUCCH formats, identified by the duration of the PUCCH and the UCI payload size. Two of the formats, "0" and "2," are referred to as short PUCCH formats, as they occupy at most two OFDM symbols. In most cases, the last two OFDM symbols in a slot are used for PUCCH transmission, for example to transmit a HARQ acknowledgment of the downlink data transmission. The short PUCCH formats include:

PUCCH format-0, capable of transmitting at most two bits and spanning one or two OFDM symbols. This format can be used to transmit a HARQ acknowledgment of downlink data transmission, or to issue a scheduling request.

PUCCH format-2, capable of transmitting more than 2-bits and spanning one or two OFDM symbols. This format can be used for CSI-reports or for multi-bits HARQ acknowledgments in the case of carrier aggregation or per-CBG retransmission.

Three additional PUCCH formats, "1," "3," and "4," are referred to as long PUCCH formats as they occupy from 4-14 symbols. One reason for having a longer time duration than the previous two formats is coverage. If a duration of one or two OFDM symbols does not provide sufficient energy for reliable reception, a longer time duration is necessary, and one of the long PUCCH formats can be used. The long PUCCH formats include:

PUCCH format-1, capable of transmitting at most 2 bits.

PUCCH format-3 and format-4, both capable of transmitting more than 2-bits, but differing in the multiplexing capacity; that is how many devices that can use the same time frequency resource simultaneously.

One or multiple PRBs can be allocated as the minimum resource unit size in the frequency domain for short PUCCH and long PUCCH. Intra-slot frequency hopping can also be configured. Table 1 below provides a summary of PUCCH formats with more detailed parameters.

TABLE 1

| PUCCH Format Summary | | | | | |
|---|---|---|---|---|---|
| Parameter | Format 0 | Format 1 | Format 2 | Format 3 | Format 4 |
| UCI Bit Length | <=2 | <=2 | >2 | >2 | >2 |
| PUCCH Length | Short | Long | Short | Long | Long |
| UE Multiplexing in Same PRB | YES | YES | NO | NO | YES |
| UCI/DMRS Multiplexing Method | N/A | TDM | FDM | TDM | TDM |
| starting PRB/PRB offset | PRB-Id | PRB-Id | PRB-Id | PRB-Id | PRB-Id |
| nrofPRBs | 1 | 1 | 1~16 | 1~16 | 1 |
| intraSlot FrequencyHopping | enabled | enabled | enabled | enabled | enabled |
| secondHopPRB | PRB-Id | PRB-Id | PRB-Id | PRB-Id | PRB-Id |
| startingSymbolIndex | 0~13 | 0~10 | 0~13 | 0~10 | 0~10 |
| nrofSymbols | 1~2 | 4~14 | 1~2 | 4~14 | 4~14 |
| initialCyclicShift | 0~11 | 0~11 | N/A | N/A | N/A |
| timeDomainOCC | N/A | 0~6 | N/A | N/A | N/A |
| occ-Length | N/A | N/A | N/A | N/A | 2, 4 |
| occ-Index | N/A | N/A | N/A | N/A | 0, 1, 2, 3 |
| Interslot FrequencyHopping | N/A | enabled | enabled | enabled | enabled |
| additional DMRS | N/A | TRUE | TRUE | TRUE | TRUE |
| maxCodeRate | N/A | | | | |

15 | 16

TABLE 1-continued

| | PUCCH Format Summary | | | | |
|---|---|---|---|---|---|
| Parameter | Format 0 | Format 1 | Format 2 | Format 3 | Format 4 |
| nrofSlots | N/A | 2, 4, 8 | 2, 4, 8 | 2, 4, 8 | 2, 4, 8 |
| pi2BPSK | N/A | enabled | enabled | enabled | enabled |
| simultaneousHARQ_ACK_CSI | N/A | TRUE | TRUE | TRUE | TRUE |

Uplink Control Signaling on PUSCH. NR further supports simultaneous transmission of data and control information on the shared channel, e.g., PUSCH. Thus, if the device is transmitting on the PUSCH, the UCI is multiplexed with data on the allocated resources instead of being transmitted on the control channel, e.g., PUCCH. Only HARQ acknowledgments and CSI reports are rerouted to the PUSCH. The mapping of the UCI is such that the more critical bits, e.g., HARQ acknowledgments, are mapped to the first OFDM symbol after the first demodulation reference symbol (DM-RS). Less critical bits, e.g., CSI reports, are mapped to the subsequent symbols. Simultaneous transmission of the PUSCH and the PUCCH is not supported in NR Rel-15.

PUCCH Resource Configuration. If a WTRU does not have a dedicated PUCCH resource configuration, provided by the PUCCH-ResourceSet in a PUCCH-Config, a PUCCH resource set is provided by pucch-ResourceCommon through an index to a row of TABLE 2: Common PUCCH Resource Sets (below) for transmission of HARQ-ACK information on the PUCCH in an initial UL bandwidth part (BWP) of $$N_{BWP}^{size}$$

physical resource blocks (PRBs). The common PUCCH resource set includes sixteen resources, each corresponding to a PUCCH format, a first symbol, a duration, a PRB offset $$(RB_{BWP}^{offset}),$$

and a cyclic shift index set for a PUCCH transmission. The frequency domain resource allocation is determined by downlink control information (DCI) and physical downlink control channel (PDCCH) channel control element (CCE) location. The WTRU transmits the PUCCH using the same spatial domain transmission filter as for a PUSCH transmission scheduled by a random access response (RAR) UL grant.

TABLE 2

| | Common PUCCH Resource Sets | | | | |
|---|---|---|---|---|---|
| Index | PUCCH format | First symbol | Number of symbols | PRB offset $RB_{BWP}^{offset}$ | Set of initial CS indexes |
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |

TABLE 2-continued

| | Common PUCCH Resource Sets | | | | |
|---|---|---|---|---|---|
| Index | PUCCH format | First symbol | Number of symbols | PRB offset $RB_{BWP}^{offset}$ | Set of initial CS indexes |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $[N_{BWP}^{size}/4]$ | {0, 3, 6, 9} |

Figure 3A:
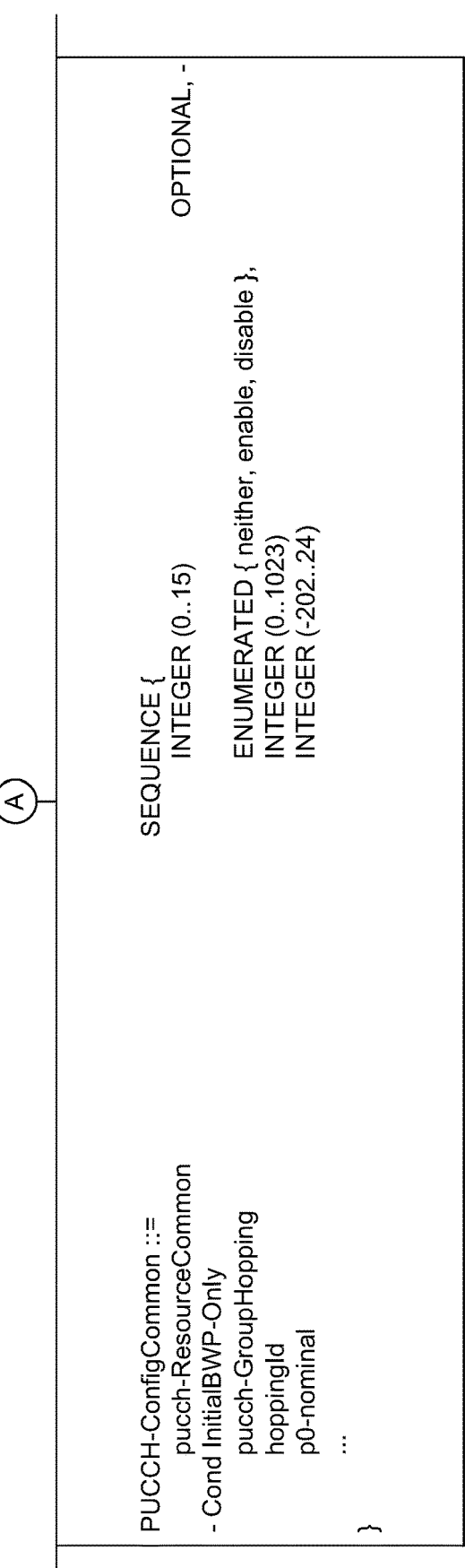

FIG. 3A shows an example of resource configuration 310 for PUCCH (pucch-ResourceCommon) using the indexing of Table 2 above. An entry for Table 2 is provided where each row configures a set of cell-specific PUCCH resources/parameters. The WTRU uses those PUCCH resources until it is provided with a dedicated PUCCH-Config (e.g., during initial access) on the initial uplink BWP. Once the network provides a dedicated PUCCH-Config for that bandwidth part the WTRU applies the dedicated configuration instead of the one from Table 2.

Figure 3B:
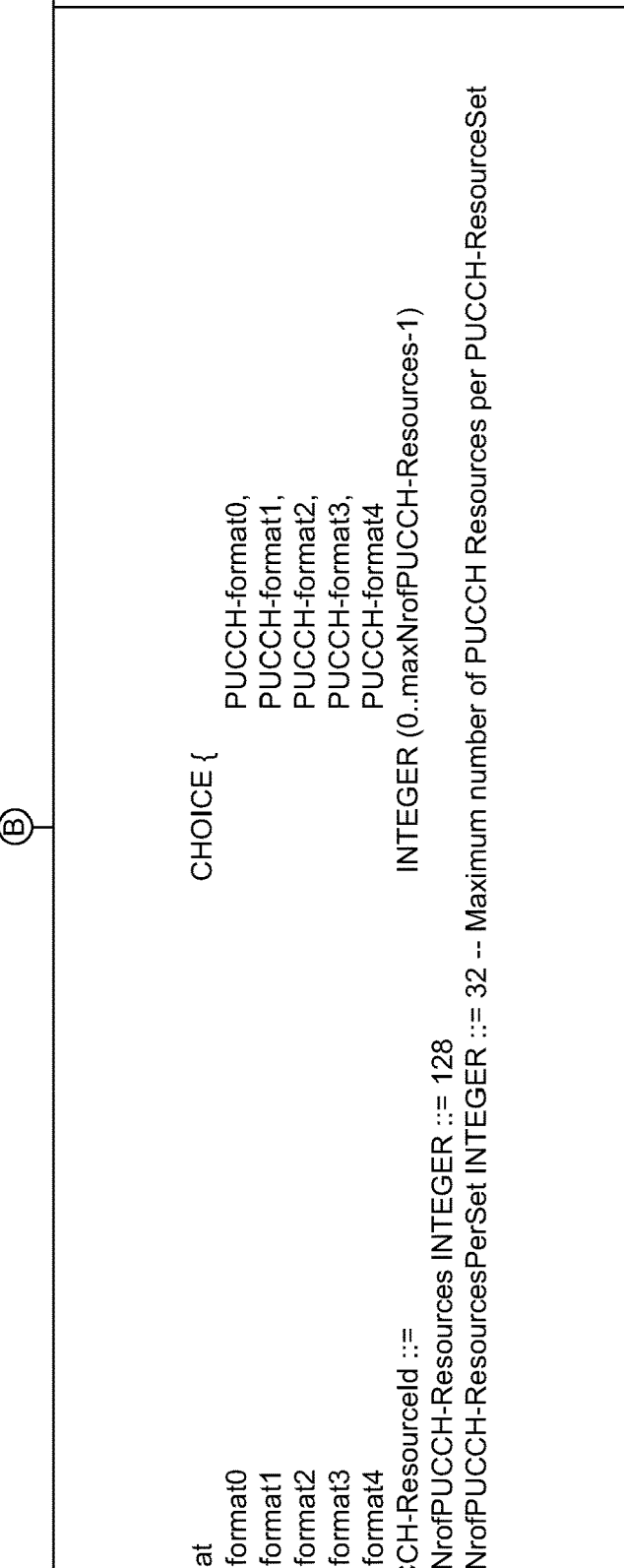

Referring to FIG. 3B, a dedicated PUCCH resource set contains one or more dedicated PUCCH resource configurations 320 where each resource configuration contains the PUCCH format to use and all the parameters relevant for that format. A WTRU can be configured with up to four dedicated PUCCH resource sets per UL BWP, each resource set corresponding to a certain range of the number of UCI bits to transmit. The first dedicated PUCCH resource set (i.e., resource set=0) can contain up to 32-PUCCH resources while the remaining sets may contain up to eight resources each. PUCCH resource set=0 can handle a UCI payload up to 2-bits, and hence may only contain PUCCH format-0 or format-1, while the remaining PUCCH resource sets may contain any PUCCH format other than format-0 and format-1. The payload ranges of resource sets 1-2 are configured by higher layer signaling and the maximum payload of resource set-3 is 1706-bits, which comes from the restriction in the Polar code. A WTRU selects the PUCCH resource set to use based on the UCI payload size.

If a WTRU has dedicated PUCCH resource configuration, the WTRU is provided by higher layers with one or more PUCCH resources. An example code portion 320 for dedicated PUCCH resource configuration is shown in FIG. 3B and includes the following parameters:

a PUCCH resource index provided by pucch-ResourceId an index of the first PRB prior to frequency hopping or for no frequency hopping by startingPRB an index of the first PRB after frequency hopping by secondHopPRB an indication for intra-slot frequency hopping by intraSlotFrequencyHopping a configuration for a PUCCH format provided by format FIG. 3C shows an example coding portion 330 for dedicated PUCCH format configurations. If the format indicates PUCCH-format0, the PUCCH format configured for a PUCCH resource is PUCCH format-0, where the PUCCH resource also includes an index for an initial cyclic shift provided by initialCyclicShift, a number of symbols for a PUCCH transmission provided by nrofSymbols, a first symbol for the PUCCH transmission provided by startingSymbolIndex.

If the format indicates PUCCH-format1, the PUCCH format configured for a PUCCH resource is PUCCH format-1, where the PUCCH resource also includes an index for an initial cyclic shift provided by initialCyclicShift, a number of symbols for a PUCCH transmission provided by nrofSymbols, a first symbol for the PUCCH transmission provided by startingSymbolIndex, and an index for an orthogonal cover code by timeDomainOCC.

If the format indicates PUCCH-format2 or PUCCH-format3, the PUCCH format configured for a PUCCH resource is PUCCH format-2 or PUCCH format-3, respectively, where the PUCCH resource also includes a number of PRBs provided by nrofPRBs, a number of symbols for a PUCCH transmission provided by nrofSymbols, and a first symbol for the PUCCH transmission provided by startingSymbolIndex. If a WTRU is provided by useInterlacePUCCH-PUSCH in BWP-UplinkDedicated, and the format indicates PUCCH-format2 or PUCCH-format3 and PUCCH-ResourceExt is provided, the PUCCH resource also includes an index of a second interlace by interlace1, if provided; otherwise, if interlace1 is not provided, the PUCCH resource also includes, if provided, an orthogonal cover code length by occ-Length and an orthogonal cover code index by occ-Index. If the format indicates PUCCH-format3 and PUCCH-ResourceExt is provided, the WTRU assumes that the $$M_{RB}^{PUCCH,3}$$

PRBs with the lowest indexes within the first, and if configured, second interlace are used for PUCCH transmission.

If the format indicates PUCCH-format4, the PUCCH format configured for a PUCCH resource is PUCCH format-4, where the PUCCH resource also includes a number of symbols for a PUCCH transmission provided by nrofSymbols, an orthogonal cover code length by occ-Length, an orthogonal cover code index by occ-Index, and a first symbol for the PUCCH transmission provided by startingSymbolIndex.

The PUCCH-format3 field includes nrofPRBs and the supported values are 1, 2, 3, 4, 5, 6, 8, 9, 10, 12, 15 and 16. The WTRU will ignore this field when formatExt is configured.

If a WTRU is not transmitting over the PUSCH, and the WTRU is transmitting UCI, the WTRU transmits UCI in a PUCCH using PUCCH format=0 if the transmission is over one symbol or two symbols and the number of HARQ-ACK information bits with positive or negative SR (HARQ-ACK/SR bits) is one or two. The WTRU uses PUCCH format=1 if the transmission is over four or more symbols and the number of HARQ-ACK/SR bits is one or two. The WTRU uses PUCCH format=2 if the transmission is over one symbol or two symbols and the number of UCI bits is more than two. The WTRU uses PUCCH format=3 if the transmission is over four or more symbols, the number of UCI bits is more than two, and the PUCCH resource does not include an orthogonal cover code, or the WTRU is provided useInterlacePUCCH-PUSCH in BWP-UplinkDedicated. The WTRU uses PUCCH format=4 if the transmission is over four or more symbols, the number of UCI bits is more than two, and the PUCCH resource includes an orthogonal cover code and the WTRU is not provided useInterlacePUCCH-PUSCH in BWP-UplinkDedicated.

When the device is about to transmit UCI, the UCI payload determines the PUCCH resource set and the PUCCH resource indicator in the DCI determines the PUCCH resource configuration within the PUCCH resource set. Thus, the scheduler has control of where the uplink control information is transmitted. For the first resource set, which may contain up to thirty-two resources, there can be more resources than what is possible to indicate with a 3-bit PUCCH resource indicator. If this is the case, the index of the first CCE of the PDCCH scheduling the uplink is used together with the PUCCH resource indicator to determine the PUCCH resource within the set. For periodic CSI reports and scheduling request opportunities, which are both semi-statically configured, the PUCCH resources are provided as part of the CSI or SR configuration.

If the WTRU transmits $O_{UCI}$ UCI information bits, that include HARQ-ACK information bits, the WTRU determines a PUCCH resource set to be one of:

a first set of PUCCH resources with pucch-ResourceSetId=0 if $O_{UCI} \leq 2$ including one or two HARQ-ACK information bits and a positive or negative SR on one SR transmission occasion if transmission of HARQ-ACK information and SR occurs simultaneously;

a second set of PUCCH resources with pucch-ResourceSetId=1, if provided by higher layers, if $2 < O_{UCI} \leq N_2$ where $N_2$ is equal to maxPayloadSize if maxPayloadSize is provided for the PUCCH resource set with pucch-ResourceSetId=1; otherwise $N_2$ is=1706;

a third set of PUCCH resources with pucch-ResourceSetId=2, if provided by higher layers, if $N_2 < O_{UCI} \leq N_3$ where $N_3$ is equal to maxPayloadSize if maxPayloadSize is provided for the PUCCH resource set with pucch-ResourceSetId=2; otherwise $N_3$=1706; or a fourth set of PUCCH resources with pucch-ResourceSetId=3, if provided by higher layers, if $N_3 < O_{UCI} \leq 1706$.

Referring to FIG. 3D, if the WTRU is provided SPS-PUCCH-AN-List 340 and transmits $O_{UCI}$ UCI information bits that include only HARQ-ACK information bits in response to one or more SPS PDSCH receptions and SR, if any, the WTRU determines a PUCCH resource to be one of:

a PUCCH resource provided by sps-PUCCH-AN-ResourceID obtained from the first entry in sps-PUCCH-AN-List if $O_{UCI} \leq 2$ including one or two HARQ-ACK information bits and a positive or negative SR on one SR transmission occasion if transmission of HARQ-ACK information and SR occurs simultaneously;

a PUCCH resource provided by sps-PUCCH-AN-ResourceID obtained from the second entry in sps-PUCCH-AN-List, if provided, if $2 < O_{UCI} \leq N_{1,SPS}$ where $N_{1,SPS}$ is either provided by maxPayloadSize obtained from the second entry in sps-PUCCH-AN-List or is otherwise=1706;

a PUCCH resource provided by sps-PUCCH-AN-ResourceID obtained from the third entry in sps-PUCCH-AN-List, if provided, if $N_{1,SPS} < O_{UCI} \leq N_{2,SPS}$ where $N_{2,SPS}$ is either provided by maxPayloadSize obtained from the third entry in sps-PUCCH-AN-List or is otherwise=1706; or a PUCCH resource provided by sps-PUCCH-AN-ResourceID obtained from the fourth entry in sps-PUCCH-AN-List, if provided, if $N_{2,SPS} < O_{UCI} \le N_{3,SPS}$ where $N_{3,SPS}$ is=1706.

In a Scheduling Request (SR) over the PUCCH, referring to FIG. 3E, a configuration information element (IE) 350 SchedulingRequestConfig is used to configure the parameters for the dedicated scheduling request resources. The SchedulingRequestResourceConfig determines physical layer resources on the PUCCH where the WTRU may send the dedicated scheduling request (D-SR). A WTRU can be configured by SchedulingRequestResourceConfig a set of configurations for SR in a PUCCH transmission using either PUCCH format-0 or PUCCH format-1. The WTRU can be provided, by phy-PriorityIndex in SchedulingRequestResourceConfig, a priority index=0 or a priority index "1" for the SR. If the WTRU is not provided a priority index for a SR, the priority index is "0." The WTRU may also be configured with a PUCCH resource using coding portion 355 of the configuration referenced by SchedulingRequestResourceId, providing a PUCCH format-0 resource or a PUCCH format-1 resource.

The WTRU is also configured a periodicity $SR_{PERIODICITY}$ in symbols or slots and an offset $SR_{OFFSET}$ in slots by periodicityAndOffset for a PUCCH transmission conveying SR. If $SR_{PERIODICITY}$ is larger than one slot, the WTRU determines a SR transmission occasion in a PUCCH to be in a slot with number $$n_{s,f}^{\mu}$$

in a frame with number $n_f$ if $$(n_f \cdot N_{slot}^{frame,\mu} + n_{s,f}^{\mu} - SR_{OFFSET}) \bmod SR_{PERIODICITY} = 0.$$

If $SR_{PERIODICITY}$ is one slot, the WTRU expects that $SR_{OFFSET}=0$ and every slot is a SR transmission occasion in a PUCCH. If $SR_{PERIODICITY}$ is smaller than one slot, the WTRU determines a SR transmission occasion in a PUCCH to start in a symbol with index l if $(l-l_0 \bmod SR_{PERIODICITY})$ mod $SR_{PERIODICITY}=0$ where $l_0$ is the value of startingSymbolIndex.

Additional configurations for SR may include periodicity and offset, resource and scheduling request ID as follows:

periodicityAndOffset-SR periodicity and offset in number of symbols or slots The following periodicities may be configured depending on the chosen subcarrier spacing (SCS):

SCS=15 kHz: 2sym, 7sym, 1sl, 2sl, 4sl, 5sl, 8sl, 10sl, 16sl, 20sl, 40sl, 80sl

SCS=30 kHz: 2sym, 7sym, 1sl, 2sl, 4sl, 8sl, 10sl, 16sl, 20sl, 40sl, 80sl, 160sl

SCS=60 kHz: 2sym, 7sym/6sym, 1sl, 2sl, 4sl, 8sl, 16sl, 20sl, 40sl, 80sl, 160sl, 320sl SCS=120 kHz: 2sym, 7sym, 1sl, 2sl, 4sl, 8sl, 16sl, 40sl, 80sl, 160sl, 320sl, 640sl (sym6or7 corresponds to 6 symbols if extended cyclic prefix and a SCS of 60 kHz are configured, otherwise it corresponds to 7 symbols. For periodicities 2sym, 7sym and sl1 the WTRU assumes an offset of 0 slots.)

resourceID-of the PUCCH resource in which the WTRU shall send the scheduling request. The actual PUCCH-Resource is configured in PUCCH-Config of the same UL BWP and serving cell as SchedulingRequestResourceConfig. The network configures a PUCCH-Resource of PUCCH-format0 or PUCCH-format1 (other formats are not supported).

schedulingRequestID—The ID of the SchedulingRequestConfig that uses this scheduling request resource.

In CSI Reporting over the PUCCH and/or the PUSCH, CSI-reference signal (RS) reporting can be periodic, semi-persistent, or aperiodic. Periodic reporting is always done on the PUCCH. In this case, the report configuration also includes information about a periodically available PUCCH resource to be used for reporting. In the case of semi-persistent reporting, a device is configured with periodically occurring reporting instances in the same way as for periodic reporting. However, actual reporting can be activated/deactivated by means of MAC signaling (MAC-CE). Semi-persistent reporting can be done on a periodically assigned PUCCH resource. Alternatively, semi-persistent reporting can be done on a semi-persistently allocated PUSCH. The latter is typically used for large reporting payloads.

Referring to FIG. 4, the semi-persistent CSI reporting on PUCCH Activation/Deactivation MAC CE 400 is identified by a MAC subheader with logical channel ID (LCID) as specified in 3GPP TS 38.321 Table 6.2.1-1. It has a fixed size of 16-bits with following fields:

Serving Cell ID: This field indicates the identity of the Serving Cell for which the MAC CE applies. The length of the field is 5 bits;

BWP ID: This field indicates a UL BWP for which the MAC CE applies as the codepoint of the DCI bandwidth part indicator field. The length of the BWP ID field is 2 bits;

$S_i$: This field indicates the activation/deactivation status of the Semi-Persistent CSI report configuration within csi-ReportConfigToAddModList. $S_0$ refers to the report configuration which includes PUCCH resources for SP CSI reporting in the indicated BWP and has the lowest CSI-ReportConfigId within the list with type set to semiPersistentOnPUCCH, $S_1$ to the report configuration which includes PUCCH resources for SP CSI reporting in the indicated BWP and has the second lowest CSI-ReportConfigId and so on. If the number of report configurations within the list with type set to semiPersistentOnPUCCH in the indicated BWP is less than i+1, MAC entity shall ignore the $S_i$ field. The $S_i$ field is set=1 to indicate that the corresponding Semi-Persistent CSI report configuration shall be activated. The $S_i$ field is set=0 to indicate that the corresponding Semi-Persistent CSI report configuration i shall be deactivated; and R: Reserved bit, set to 0.

Aperiodic reporting is always done on the scheduled PUSCH and is thus explicitly triggered by means of DCI signaling, more specifically, with a CSI-request within the uplink scheduling grant (DCI format 0_1). The DCI field may consist of up to 6-bits with each configured aperiodic report associated with a specific bit combination and up to sixty three different aperiodic reports can be triggered.

Figure 5A:
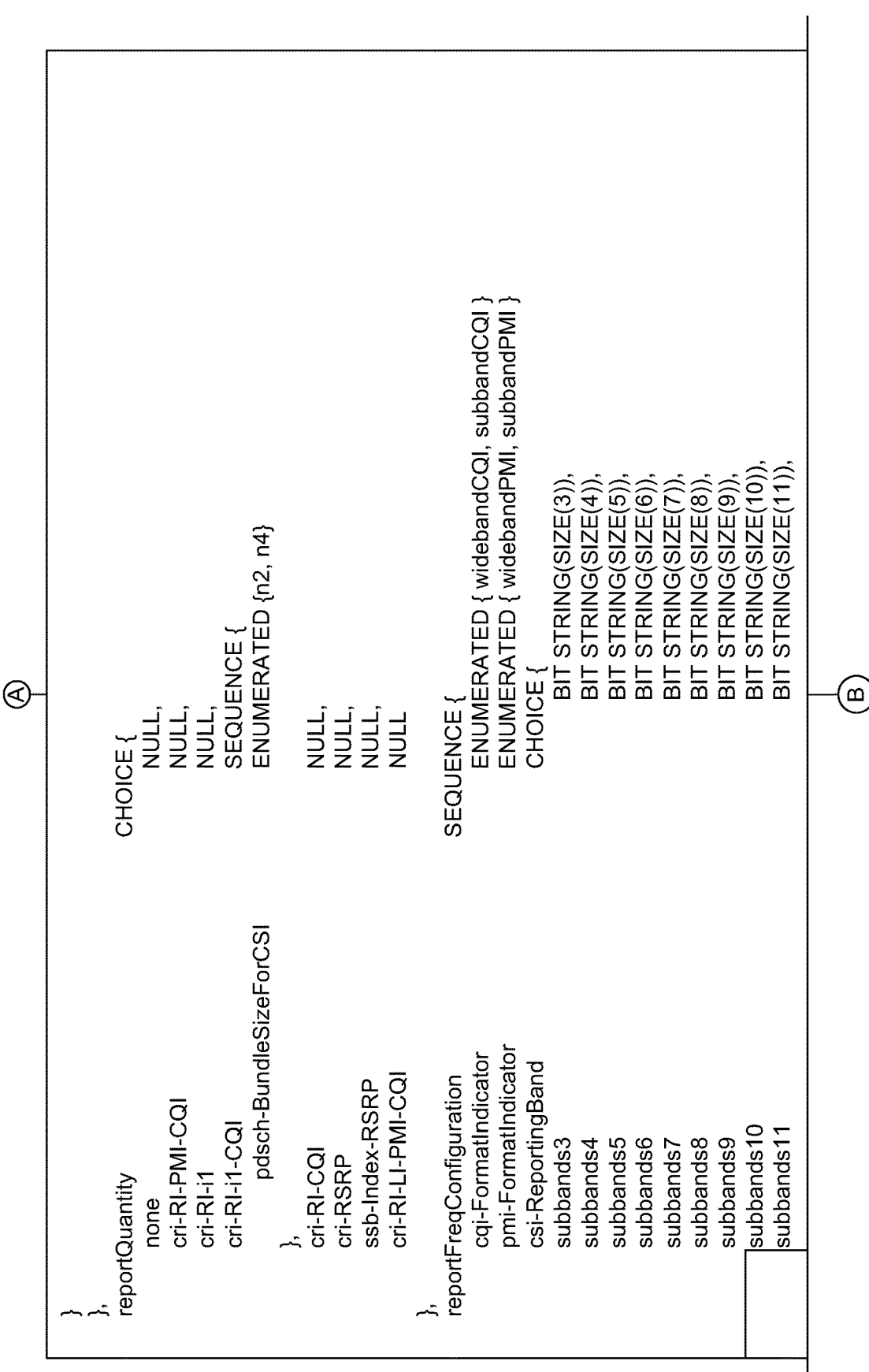
FIGS. 5A-5B shows an example configuration for channel state information (CSI) reporting.
Figure 5B:

Referring to FIG. 5, a configuration 500 referenced as CSI-ReportConfig, may be used to configure a periodic or semi-persistent report sent on the PUCCH of the cell in which the CSI-ReportConfig is included, or to configure a semi-persistent or aperiodic report sent on the PUSCH triggered by DCI received on the cell in which the CSI- ReportConfig is included (in this case, the cell on which the report is sent is determined by the received DCI). Configuration 500 may include elements for power control and uplink resources including:

p0alpha: Index of the p0-alpha set determining the power control for the semi-persistent CSI report transmission over PUSCH; and pucch-Resource: PUCCH resource for the associated uplink BWP. Only PUCCH-Resource of formats 2, 3 and 4 is supported. The actual PUCCH-Resource is configured in PUCCH-Config and referred to by its ID. When two PUCCH-Config are configured within PUCCH-ConfigurationList, PUCCH-ResourceId in a PUCCH-CSI-Resource refers to a PUCCH-Resource in the PUCCH-Config used for HARQ-ACK with low priority.

For PUCCH Power Control, if a WTRU transmits a PUCCH on active UL BWP b of carrier f in the primary cell c using PUCCH power control adjustment state with index i, the WTRU determines the PUCCH transmission power $P_{PUCCH,b,f,c}(i,q_u,q_d,l)$ in PUCCH transmission occasion i as referenced in section 7.1.1 of 3GPP TS 38.213 (2022-12) with the equation:

$$P_{PUCCH,b,f,c}(i, q_u, q_d, l) =$$
$$\min\left\{\begin{array}{l} P_{CMAX,f,c}(i), \\ P_{O\_PUCCH,b,f,c}(q_u) + 10\,log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + \\ g_{b,f,c}(i, l) \end{array}\right\} \text{[dBm]} \quad \text{Eq. 1}$$

Where:

$P_{CMAX,f,c}(i)$ is the WTRU configured maximum output power defined for carrier f of primary cell c in PUCCH transmission occasion i.

$P_{O\_PUCCH,b,f,c}(q_u)$ is a parameter composed of the sum of a component $P_{O\_NOMINAL\_PUCCH}$, provided by p0-nominal, or $P_{O\_NOMINAL\_PUCCH}=0$ dBm if p0-nominal is not provided, for carrier f of primary cell c and, if provided, a component $P_{O\_UE\_PUCCH}(q_u)$ provided by p0-PUCCH-Value in P0-PUCCH for active UL BWP b of carrier f of primary cell c, where $0\le q_u<Q_u$. $Q_u$ is a size for a set of $P_{O\_UE\_PUCCH}$ values provided by maxNrofPUCCH-P0-PerSet. The set of $P_{O\_UE\_PUCCH}$ values is provided by p0-Set. If p0-Set is not provided to the WTRU, $P_{O\_UE\_PUCCH}(q_u)=0$, $0\le q_u<Q_u$.

If the WTRU is provided PUCCH-SpatialRelationInfo, the WTRU obtains a mapping, by an index provided by p0-PUCCH-Id, between a set of pucch-SpatialRelationInfoId values and a set of p0-PUCCH-Value values. If the WTRU is provided more than one values for pucch-SpatialRelationInfoId and the WTRU receives an activation command indicating a value of pucch-SpatialRelationInfoId, the WTRU determines the p0-PUCCH-Value value through the link to a corresponding p0-PUCCH-Id index.

If the WTRU is not provided PUCCH-SpatialRelationInfo, the WTRU obtains the p0-PUCCH-Value value from the P0-PUCCH with p0-PUCCH-Id value equal to the minimum p0-PUCCH-Id value in p0-Set $$M_{RB,b,f,c}^{PUCCH}(i)$$

is a bandwidth of the PUCCH resource assignment expressed in number of resource blocks for PUCCH transmission occasion i on active UL BWP b of carrier f of primary cell c and μ is a SCS configuration.

$PL_{b,f,c}(q_d)$ is a downlink pathloss estimate in dB calculated by the WTRU using RS resource index $q_d$ for the active DL BWP b of carrier f of the primary cell c.

The parameter $\Delta_{F\_PUCCH}(F)$ is a value of deltaF-PUCCH-f0 for PUCCH format-0, deltaF-PUCCH-f1 for PUCCH format-1, deltaF-PUCCH-f2 for PUCCH format-2, deltaF-PUCCH-f3 for PUCCH format-3, and deltaF-PUCCH-f4 for PUCCH format-4, if provided; otherwise $\Delta_{F\_PUCCH}(F)=0$.

$\Delta_{TF,b,f,c}(i)$ is a PUCCH transmission power adjustment component on active UL BWP b of carrier f of primary cell c.

For the PUCCH power control adjustment state $g_{b,f,c}(i,l)$ for active UL BWP b of carrier f of primary cell c and PUCCH transmission occasion i and PUCCH power control adjustment state l; $l\in\{0,1\}$ if the UE is provided twoPUCCH-PC-AdjustmentStates and PUCCH-SpatialRelationInfo, or more than one sets of power control parameters for operation in FR1, l=0 if the UE is not provided twoPUCCH-PC-AdjustmentStates or PUCCH-SpatialRelationInfo and more than one sets of power control parameters, and l=0 if the PUCCH transmission provides only multicast HARQ-ACK information.

$\delta_{PUCCH,b,f,c}(i,l)$ is a TPC command value included in a DCI format scheduling a PDSCH reception for active UL BWP b of carrier f of the primary cell c that the WTRU detects for PUCCH transmission occasion i, or is jointly coded with other TPC commands in a DCI format 2_2 with CRC scrambled by TPC-PUCCH-RNTI.

The current PUCCH power control adjustment state l for active UL BWP b of carrier f of primary cell c and PUCCH transmission occasion i, is given by the following equation:

$$g_{b,f,c}(i, l) = g_{b,f,c}(i - i_0, l) + \sum_{m=0}^{C(C_i)-1} \delta_{PUCCH,b,f,c}(m, l) \quad \text{Eq. 2}$$

where the $\delta_{PUCCH,b,f,c}$ values are given in Table 3 below:

TABLE 3

| Mapping of TPC Command Field Values | |
|---|---|
| TPC Command Field | Accumulated $\delta_{PUCCH, b, f, c}$ [dB] |
| 0 | −1 |
| 1 | 0 |
| 2 | 1 |
| 3 | 3 |

$$\sum_{m=0}^{C(C_i)-1} \delta_{PUCCH,b,f,c}(m, l)$$

is a sum of TPC command values in a set c, of TPC command values with cardinality $c(C_i)$ that the WTRU receives between $K_{PUCCH}(i-i_0)-1$ symbols before PUCCH transmission occasion $i-i_0$ and $K_{PUCCH}(i)$ symbols before PUCCH transmission occasion i on active UL BWP b of carrier f of primary cell c for PUCCH power control adjustment state, where $i_0>0$ is the smallest integer for which $K_{PUCCH}(i-i_0)$ symbols before PUCCH transmission occasion $i-i_0$ is earlier than $K_{PUCCH}(i)$ symbols before PUCCH transmission occasion i.

Figure 6:
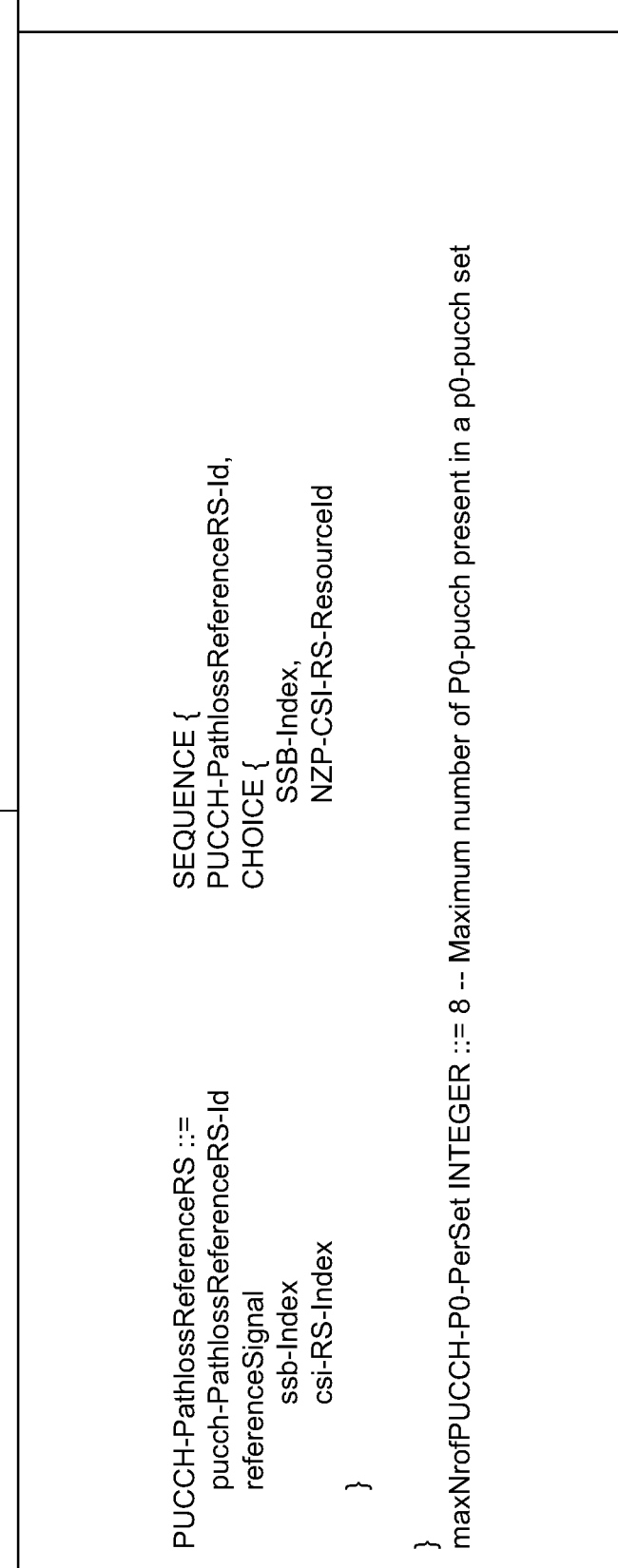
FIG. 6 shows an example configuration for PUCCH power control.

FIG. 6 shows an example configuration 600 of PUCCH power control. In this configuration, p0-PUCCH-Value may use a P0 value for the PUCCH with 1 dB step size. A p0-Set element is a set with dedicated P0 values for the PUCCH, i.e., {P01, P02, . . . }. The pathlossReferenceRSs configuration element provides a set of Reference Signals (e.g., a CSI-RS config or a synchronization signal (SS) block) to be used for the PUCCH pathloss estimation. Up to maxNrof-PUCCH-PathlossReference-RSs may be configured. If the field is not configured, the WTRU uses the synchronization signal block (SSB) as reference signal. A twoPUCCH-PC-AdjustmentStates field may be used to identify a number of PUCCH power control adjustment states maintained by the WTRU (i.e., g(i) from above). If the field is present (n2) the WTRU maintains two power control states (i.e., g(i,0) and g(i,1)). If the field is absent, it maintains one power control state (i.e., g(i,0)).

In one embodiment, dynamic reconfiguration of the PUCCH resources is used to mitigate interference to and from radars. The process may be triggered by narrowband high-power interference level (e.g., from the scenario in FIG. 2) that exceeds a predefined threshold. The narrowband high-power interferer (e.g., radar) event triggering process can be achieved by either an external node that is independently determining radar characteristics such as interference level, range, angle of arrival (AoA) or by observing the cellular domain protocol stack measurements that are provided by WTRUs or determined by the network nodes (i.e., gNBs). In this case, an external independent node is assumed to have synchronization with the network (i.e., gNB(s)).

Figure 7:
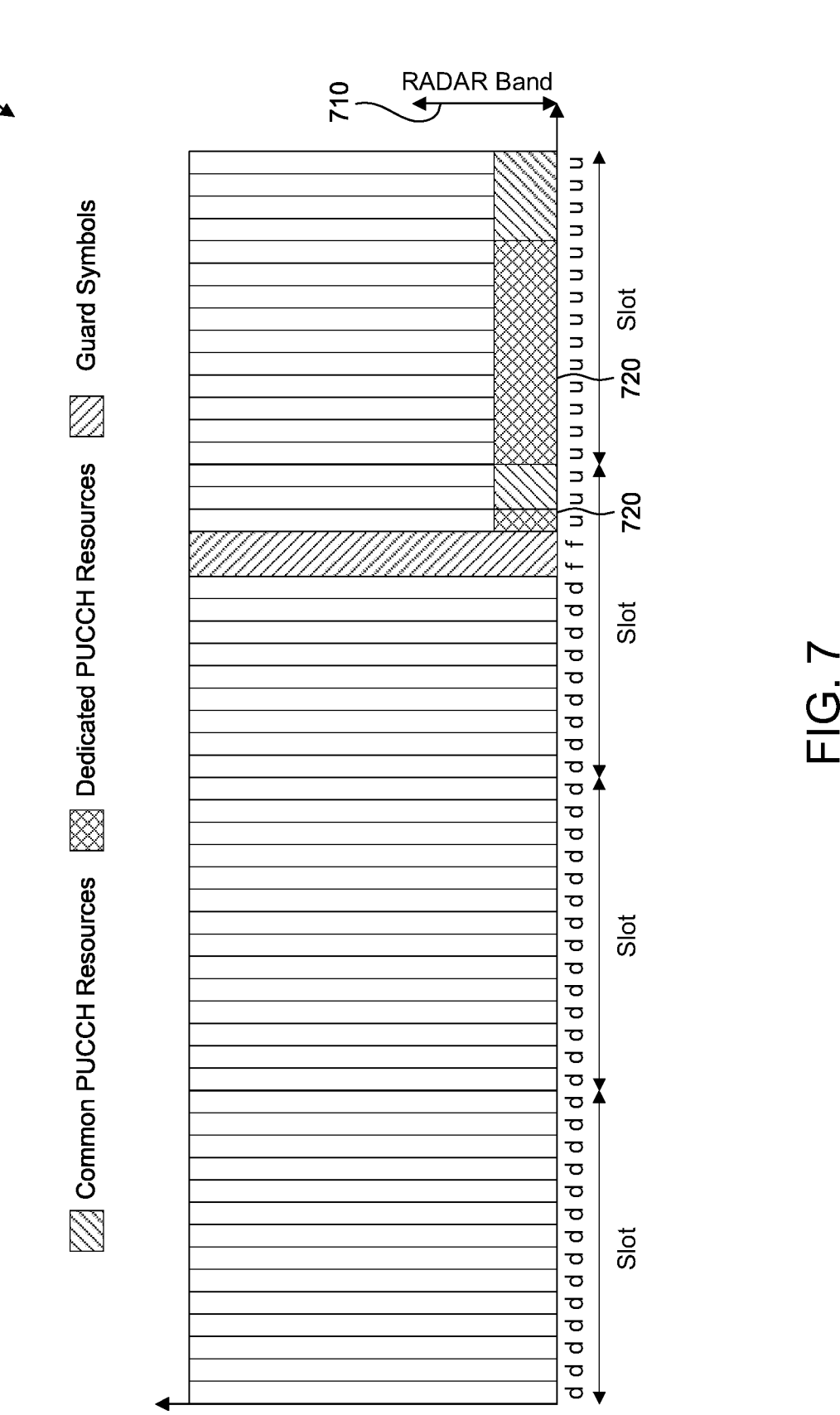
FIG. 7 is an example resource diagram showing a first scenario of allocated common and dedicated PUCCH resource used in a wireless network.

Upon the triggering of radar presence indication, the network is informed with the radar parameters such as carrier location, interference bandwidth, AoA, power spectral density (PSD). Then, the network makes an assessment by comparing the radar carrier and bandwidth to the existing PUCCH configuration frequency domain locations. Referring to FIG. 7 resource diagram 700, if the network decides that the radar interference band 710 may disrupt the dedicated PUCCH transmission/reception 720, the network may calculate a new dedicated PUCCH configuration with frequency locations away from the radar interference 710 in the UL bandwidth part (BWP). In one embodiment, this may be achieved by adjusting, among other parameters, a startingPRB in the PUCCH-Resource information element (IE).

Figure 8:
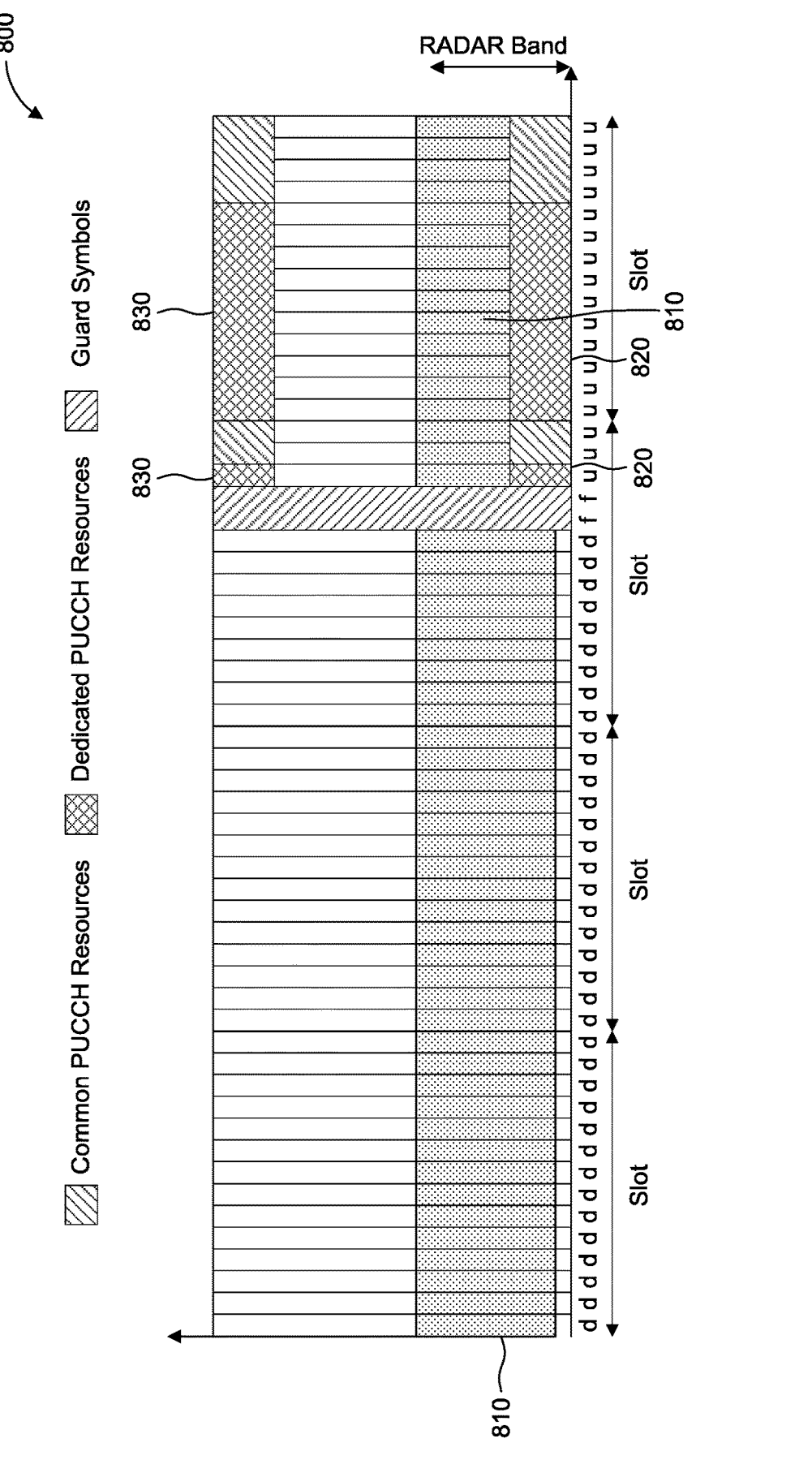
FIG. 8 is an example resource diagram showing a second scenario of using an allocated set of first PUCCH resources and second PUCCH resources in the presence of radar interference.

As shown in FIG. 8 resource diagram 800, the network reconfigures the relevant WTRUs to use the new dedicated PUCCH configuration resources 830 via dedicated higher layer signaling. Both old dedicated PUCCH resources 820 and new dedicated PUCCH resources 830 may be available until all WTRUs subject to potential interference are reconfigured. Thereafter, as shown in FIG. 9 resource diagram 900, the WTRUs utilize only new PUCCH resources 930, which are not impacted by frequencies of interferer/radar band 910.

Figure 9:
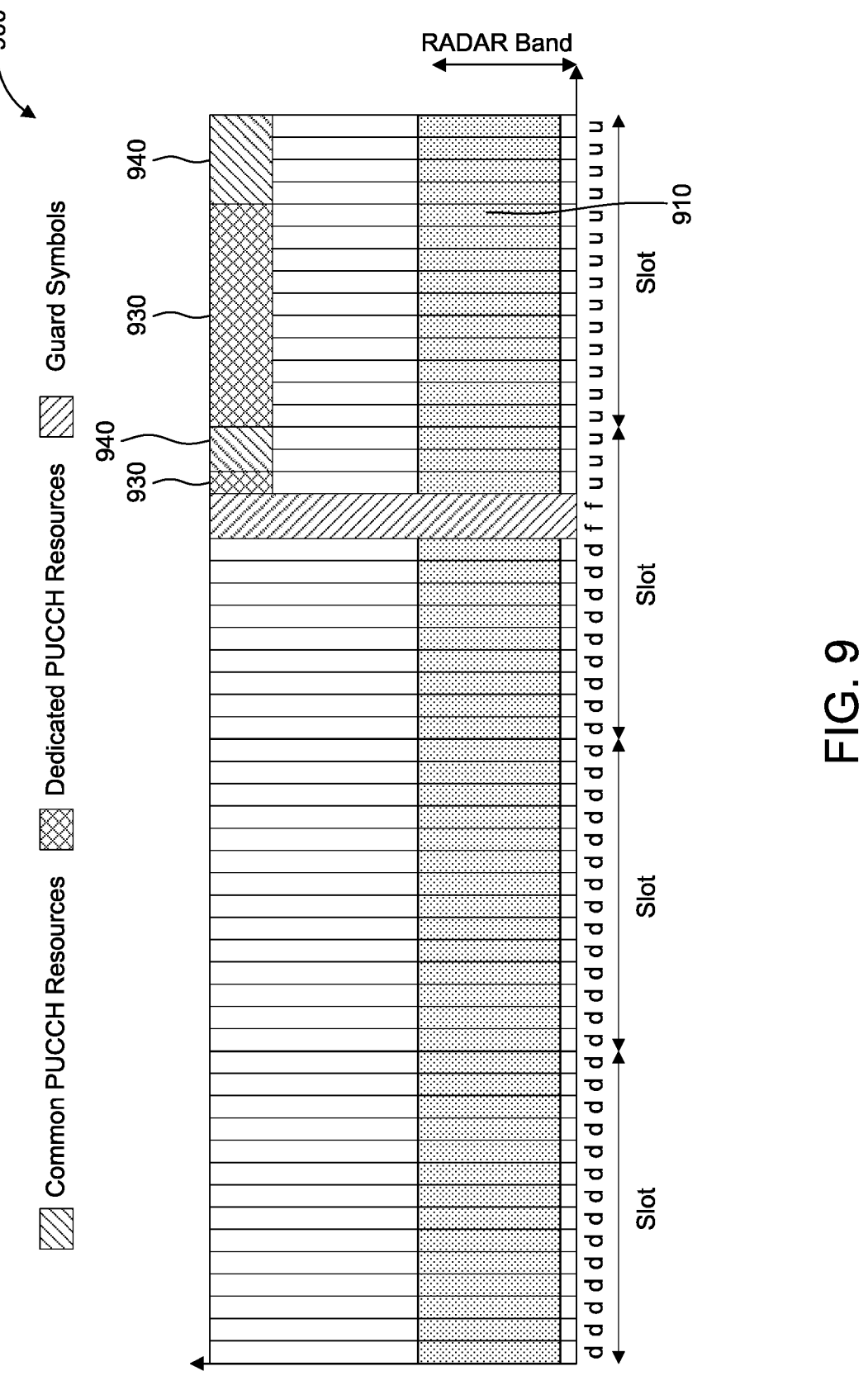
FIG. 9 is an example resource diagram showing a third scenario of using resources of only the allocated PUCCH resources in the set that are not impacted by presence of the radar.
Figure 10A:
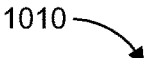

FIG. 10A shows one example PUCCH resource configuration 1010 to implement the switch to new dedicated PUCCH resources described in reference to FIGS. 8 and 9. In some embodiments, referring to FIG. 9, the network may also inform newly connecting WTRUs, e.g., via system information block (SIB) signaling, to change the frequency location of the common PUCCH 940, if common PUCCH configuration in the initial UL BWP may also be impacted by radar frequency band 910. Since the frequency location of the common PUCCH resources 940 are determined based on the PRB offset (as defined in Table 2 above) relative to frequency range of the initial UL BWP (as well as the PUCCH resource indicator field in the DCI format 1_0 or 1_1 and the associated PDCCH CCE information such as the index of a first CCE for the PDCCH reception and the number of CCEs in a CORESET of a PDCCH reception with the DCI format).

In one embodiment, referring to FIG. 10B updated configuration 1020, the initial UL BWP frequency location and/or bandwidth may be relocated via the locationAndBandwidth parameter (within the genericParameters of the BWP-UplinkCommon IE). In addition, the pucch-Resource-Common in the PUCCH-ConfigCommon IE may also be reconfigured to apply a different PRB offset.

According to other embodiments, referring to FIG. 11, PUCCH frequency locations may be diversified to mitigate interference to and from radars. As shown by the resource diagram 1100, in order to prevent radar interference from impacting PUCCH transmissions and receptions, first PUCCH resources 1110 can be defined and second PUCCH resources 1120 defined at diverse frequency locations (e.g., at different band edges) of the UL BWP 1105 to provide diversity in frequency domain. Alternatively, or in addition, a PUCCH resources may be assigned in multiple slots 1110 1120 to provide diversity in the time domain.

In embodiments for dynamic ACK/NACK reporting, the PUCCH resource indicator signaled via the PDCCH DL assignment 1115 (e.g., DCI format 1_0 for RACH Msg-4 transmission and DCI format 1_1/DCI format 1_2 for PDSCH data transmission) can be used to select a PUCCH resource 1125 corresponding to the frequency location (e.g., band edge) and/or slot that will not incur interference from the radar.

In reference to FIG. 12, to enhance the reliability of SPS ACK/NACK reporting, the corresponding PUCCH resources may use configuration information 1200, via the sps-PUCCH-AN-List in the PUCCH-Config IE, to overprovision resources with an additional list (possibly more). In example configuration 1200, resources identified in an sps-PUCCH-AN-List1, may be configured differently from resources identified in sps-PUCCH-AN-List, i.e., separated in the frequency domain (e.g., on the opposite band edges of the UL BWP) to be more resilient to radar interference.

In certain embodiments, to prevent radar interference from impacting the SPS PUCCH AN reporting, group common signaling, or MAC-CE may be used to semi-persistently select the SPS PUCCH AN list that will not incur interference from the radar. To this end, a set of SPS PUCCH AN resource list identifiers (e.g., one per UL BWP) can be used to identify which SPS PUCCH AN list should the sps-PUCCH-AN-ResourceID be obtained from for each of the four ranges of UCI information payload size, as shown by the SPS PUCCH AN resource list selection MAC CE command below:

R/F/LCID (1 byte): Reserved bit (R), is set=0; the format field (F)=1-bit; and Logical Channel ID (LCID)=6 bits;

Extended Logic Channel ID (eLCID): (1 or 2 bytes), 1-byte if LCID=33, 2-bytes if LCID=34; a unique eLCID value may be used to identify the SPS PUCCH AN resource list selection command;

L: (1 or 2 bytes, 1-byte if F=0, 2-bytes if F=1); the length field indicating the length of the corresponding MAC SDU or variable sized MAC-CE in bytes; and SPS PUCCH AN resource list identifier (2 bytes), where SPS PUCCH AN resource list identifier BWP-1 (4 bits), SPS PUCCH AN resource list identifier BWP-2 (4 bits), SPS PUCCH AN resource list identifier BWP-3 (4 bits) and SPS PUCCH AN resource list identifier BWP-4 (4 bits).

In one embodiment, for each configured UCI information payload range, a bit=0 in the SPS PUCCH AN list identifier indicates that the sps-PUCCH-AN-ResourceID configured in the sps-PUCCH-AN-List should be used, while a bit=1 indicates that the sps-PUCCH-AN-ResourceID configured in the sps-PUCCH-AN-List1 should be used. In another embodiment, the bit in SPS PUCCH AN resource list selection command can be defined to select the list as a whole (instead of per individual sps-PUCCH-AN-ResourceID). For example, using the following definition, with 2-bits per BWP, the network may configure up to three additional SPS PUCCH AN lists per UL BWP.

SPS PUCCH AN list identifier (1-byte): SPS PUCCH AN list identifier BWP 1 (2 bits); SPS PUCCH AN list identifier BWP 2 (2 bits); SPS PUCCH AN list identifier BWP 3 (2 bits) and/or SPS PUCCH AN list identifier BWP 4 (2 bits).

The WTRU may inform the network of its capability to support SPS PUCCH AN list selection, based on the Table 4 below to indicate the information shown.

26 or MAC-CE may be used to semi-persistently disable PUCCH scheduling request resources configured on the frequency location (e.g., band edge) and/or slot that will incur interference from the radar. An example of semi-persistent PUCCH SR resource suspension command (MAC CE) is as follows:

R/F/LCID (1 byte): Reserved bit (R) is set=0; the format field (F) is 1-bit, and Logical Channel ID (LCID) is 6-bits;

Extended Logic Channel ID (eLCID): 1 or 2 bytes, 1-byte if LCID=33, 2-bytes if LCID=34, a unique eLCID value may be used to identify the PUCCH SR resource suspension command;

L (1 or 2 bytes, 1-byte if F=0, 2-bytes if F=1): the length field indicating the length of the corresponding MAC SDU or variable sized MAC-CE in bytes; and PUCCH SR resource suspension bitmap (up to 4 bytes): PUCCH SR resource BWP-1 (1-byte); PUCCH SR resource BWP-2 (1-byte); PUCCH SR resource BWP-3 (1-byte); and/or PUCCH SR resource BWP-4 (1-byte).

Referring to FIG. 13, the bit location in PUCCH SR resource suspension bitmap follows the order of the schedulingRequestResourceId configured in the PUCCH-Config per dedicated UL BWP. A bit=1 indicates the suspension of the PUCCH SR resource, while a bit=0 indicates normal operation. If the number of PUCCH SR resources within a dedicated UL BWP is smaller than the maximum allowed number of PUCCH SR resources (maxNrofSR-Resources=8) per UL BWP, the network may set the bit=0 for unconfigured PUCCH SR resources. A WTRU may ignore the bits that do not correspond to any RRC configured PUCCH SR resources.

The network can also over-configure PUCCH SR resources and suspend the over-configured PUCCH SR resources during normal operation. The suspended PUCCH SR resources may still be dynamically scheduled for PUSCH transmission to enhance spectral efficiency. Upon the detection of radar interference that impacts some of the working PUCCH SR resources, the network can suspend the impacted PUCCH SR resources and at the same time unsuspend some of the over-configured PUCCH SR resources that are not impacted by radar interference to recover the lost PUCCH SR capacity. To this end, as shown by configuration 1300 in FIG. 13, the maximum allowed number of PUCCH SR resources (i.e., maxNrofSR-Resources) per UL BWP may be increased (e.g., to 16), along with the corresponding MAC CE bitmap ranges, to allow more room for over-configuration.

TABLE 4

| WTRU PUCCH AN List Selection Capabilities Message | | | | |
| --- | --- | --- | --- | --- |
| Definitions for parameters | Per | M | FDD-TDD DIFF | FR1-FR2 DIFF |
| spsPucchAckNackResourceListSelection Indicates whether the WTRU supports SPS PUCCH AN list selection | WTRU | No | No | No |

In embodiments for scheduling request (SR) reporting, the PUCCH resources can be configured on diverse frequency locations (e.g., both edges of the UL BWP) via the SchedulingRequestConfig. To prevent radar interference from impacting the SR reporting, group common signaling, PUCCH SR resource suspension bitmap (up to 8-bytes): PUCCH SR resource BWP-1 (up to 2-bytes); PUCCH SR resource BWP-2 (up to 2 bytes); PUCCH SR resource BWP-3 (up to 2-bytes); and/or PUCCH SR resource BWP-4 (up to 2-bytes).

A WTRU should inform the network of its capability to support semi-persistent PUCCH resource suspension. An example message may include the following information of Table 5 below.

TABLE 5

| WTRU SR Suspension Capabilities Message | | | | |
|---|---|---|---|---|
| Definitions for parameters | Per | M | FDD-TDD DIFF | FR1-FR2 DIFF |
| pucchSemiPersistentSrResourceSuspension Indicates whether the WTRU supports semi-persistent PUCCH SR resource suspension | WTRU | No | No | No |

For CSI reporting, PUCCH resources can be configured on diverse frequency locations (e.g., both edges of the UL BWP) via the CSI-ReportConfig. To prevent radar interference from impacting the CSI reporting, group common signaling, or MAC-CE may be used to semi-persistently select PUCCH CSI reporting resources configured on the frequency location (e.g., close to band edge) and/or slot that will not incur interference from the radar.

In one embodiment, diverse frequency CSI reporting may be achieved by configuring multiple Semi-Persistent (SP) CSI report configurations within csi-ReportConfigToAdd-ModList that are spread apart in frequency, e.g., a frequency band separates CSI report configurations. Some of the multiple SP CSI report configurations may initially be deactivated. Upon the detection of radar or other interference, if any of the activated PUCCH resources for SP CSI reporting are impacted, the network can deactivate the impacted PUCCH resource(s) and simultaneously activate some of initially deactivated SP CSI PUCCH resources that would not be impacted by the radar interference to continue the CSI reporting. In this case, it may be useful to extend the $S_i$ field in the SP CSI reporting on PUCCH Activation/Deactivation MAC CE (see above) to a range from 0-7 (as compared to the current 0-3) to further enhance the switching flexibility.

The switching of the PUCCH resources may be triggered for a WTRU when the radar interference exceeds a threshold. The threshold may be preconfigured, determined dynamically or provided by an external entity. The gNB may use information characterizing the operation of the radar to determine the interference level. In one example, radar AOA information is used by the gNB to determine the spatial direction of the radar interference in the cell. The gNB may determine a WTRU's effective "communication" direction based on the spatial direction of an SSB or CSI-RS that is used for reception of the PUCCH. Alternatively, the WTRU's location may be determined by the gNB using positioning algorithms, may be (pre)configured in the gNB via an operation, administration and management (OAM) interface, or may be reported to the gNB by the WTRU. The gNB would then avoid the PUCCH resources overlapping with the radar/interferer bandwidth for WTRUs located in areas of the cell that would incur radar interference exceeding a threshold.

In some embodiments, dynamic switching of CSI reporting between the PUCCH and the PUSCH may be used to mitigate interference to and from radars. The CSI report can include different combinations of channel quality indicator (CQI), rank indicator (RI) and precoder matrix indicator (PMI), jointly or individually referred to as channel-state information (CSI). Alternatively, the report configuration may indicate reporting of reference signal received power (RSRP). RSRP is a key quantity to measure and report as part of higher layer radio resource management (RRM). In addition, NR also supports layer-1 reporting of RSRP (L1-RSRP), for example, as part of the support for beam management. L1-RSRP reporting does not include the layer-3 filtering applied for the higher-layer RSRP reporting.

CSI-RS reporting can be periodic, semi-persistent, or aperiodic. Periodic reporting is done on the PUCCH. In this case, the report configuration also includes information about a periodically available PUCCH resource to be used for reporting. In the case of semi-persistent reporting, a device is configured with periodically occurring reporting instances in the same way as for periodic reporting. However, actual reporting can be activated/deactivated by MAC signaling (MAC-CE). Semi-persistent reporting can be done on a periodically assigned PUCCH resource. Alternatively, semi-persistent reporting can also be done on a semi-persistently allocated PUSCH. The latter is typically used for large reporting payload.

Aperiodic reporting is explicitly triggered via DCI signaling, more specifically with a CSI-request within the uplink scheduling grant (DCI format 0_1). The DCI field may consist of up to 6-bits with each configured aperiodic report associated with a specific bit combination. Thus, up to sixty-three different aperiodic reports can be triggered.

To mitigate dynamic higher power radar interference and facilitate efficient use of the PDCCH resources, semi-persistent CSI reporting on PUCCH can be configured. Upon the detection of radar interference overlapping with the PUCCH resources configured for a given WTRU, a MAC-CE can be signaled to that WTRU to deactivate/suspend semi-persist CSI reporting. At the same time, gNB can schedule aperiodic CSI-reporting over PUSCH on PRBs that are not overlapping with radar bandwidth to ensure the CSI information can be communicated to the gNB. When the radar interference falls below the threshold, gNB can resume the semi-persistent CSI-RS reporting and stop scheduling any aperiodic CSI-report over PUSCH.

In some embodiments, power boosting of PUCCH transmissions for WTRUs that will incur interference from radars may be used to ensure proper reception of UCI. PUCCH power boosting may be triggered when a WTRU may be impacted by radar interference that exceeds a threshold. The threshold may be preconfigured, determined dynamically, or provided by an external entity. Different thresholds may be defined and selected by the gNB.

The gNB may use information characterizing the operation of the radar to determine the interference level. In one example, radar AOA information is used by the gNB to determine the spatial direction of the radar interference in the cell. The gNB may determine a WTRU's effective "communication" direction based on the spatial direction of an SSB or CSI-RS that is used for reception of the PUSCH. Alternatively, the WTRU's location may be determined by the gNB using positioning algorithms, may be (pre)configured in the gNB via an OAM interface, or may be reported to the gNB by the WTRU. The gNB would then use power boosting for WTRUs located in areas of the cell that would incur radar interference exceeding a threshold.

Power boosting can be explicitly performed by employing a target received power P0 value higher than the nominal P0 value for outer loop power control via RRC signaling. Alternatively, the value of P0 may be updated via MAC CE, group common signaling, or dynamic scheduling. In either case, the SINR target for the inner loop power control should be increased correspondingly.

For example, referring to FIG. 14 configuration information 1400, a p0-Nominal-List IE can be defined in the higher layer (within the PUCCH-PowerControl IE) to support the configuration of multiple P0-PUCCH-Nominal values per UL BWP. In addition, a semi-persistent PUCCH p0-normal update MAC CE command that includes a PUCCH per BWP p0-nominal identifier can be used to facilitate more flexible change of the PUCCH power control settings. For each p0-Nominal index, a value=0 indicates the parameter p0-nominal in the PUCCH-ConfigCommon IE should applied. The index value between 1-3 indicates which of the p0-PUCCH-Nominal values configured in the p0-Nominal-List should be applied as the p0-nominal in PUCCH power control process for the corresponding UL BWP (in place of the p0-nominal in the PUCCH-ConfigCommon IE). Similar to previous embodiments, an example configuration format may include the following:

R/F/LCID (1-byte): where a reserved bit (R) is set=0, format field (F) is 1-bit; and Logical Channel ID (LCID) is 6-bits;

Extended Logic Channel ID (eLCID) is 1-2 bytes, 1-byte if LCID=33, 2-bytes if LCID=34; a unique eLCID value may be used to identify the semi-persistent PUCCH p0-normal update command.

Length Field (L) is 1-2 bytes, 1-byte if F=0, 2-bytes if F=1; the length field indicates the length of the corresponding MAC SDU or variable sized MAC-CE in bytes; and PUCCH per BWP p0-nominal identifier (1-byte), where p0-Nominal index BWP-1 (2-bits), p0-Nominal index BWP-2 (2-bits), p0-Nominal index BWP-3 (2-bits) and/or p0-Nominal index BWP-4 (2-bits).

Also as in previous embodiments, a WTRU should inform the network of its capability to support semi-persistent PUCCH p0-nominal update. An example notification message may include the following information shown in Table 6.

used to mitigate interference to and from radars, where an external node to the network can monitor 1505 potential interferer characteristics such as carrier frequency, bandwidth, periodicity, dwell time, angle of arrival (AoA), and power spectral density (PSD). Alternatively, or in addition, these characteristics may also be monitored 1505 within the wireless network by observing measurements relevant to both WTRUs and the gNBs. In various embodiments, the PSD level passing 1510 a predefined threshold triggers an event.

Upon the event triggering 1510, the network determines 1515 whether the common PUCCH is impacted by radars/Interferers. If so, the network determines 1520 a new common PUCCH resource set configuration and/or an updated initial UL BWP configuration and broadcasts an updated system information block (e.g., SIB1) messages to inform emerging/newly connecting WTRUs that initially use the defined common PUCCH resources.

The network may further determine 1525 whether the dedicated PUCCH is impacted by the interferer(s). If so, the network mitigates 1530 the interference by determining, or signaling, new dedicated PUCCH configuration frequency locations to use and reconfigures corresponding WTRUs to the new dedicated PUCCH configuration frequency locations. In some embodiments, the network supports both PUCCH configuration frequency locations until all the WTRUs are configured to use the new PUCCH configuration frequency locations before the original PUCCH configurations are removed.

In certain embodiments, implementing mitigation 1530 may use diverse PUCCH frequency locations to mitigate interference to and from radars. As previously described, the network may define PUCCH resources at diverse frequency locations, such as the band edges, of the UL BWP and/or in multiple slots to provide diversity in the time and/or frequency domains, as shown and described in reference to FIGS. 7 and 8 above. When one edge of the PUCCH resources is impacted by related frequencies of the high-power narrowband interferer, the diverse or opposite frequency resource is likely not affected and can be signaled and utilized for PUCCH transmissions. In some embodiments, the frequency diversity is separated by a band, or a gap, of unused frequencies in an UL BWP to provide improved diversity. In this context, unused means not used for PUCCH transmissions in the same UL BWP.

In another embodiment, upon the event triggering at step 1515 (or 1525), in implementing mitigation 1530, the network selects a PUCCH resource for dynamic ACK/NACK

TABLE 6

| WTRU p0-Nominal Capabilities Message | | | | |
|---|---|---|---|---|
| Definitions for parameters | Per | M | FDD-TDD DIFF | FR1-FR2 DIFF |
| pucchSemiPersistentP0Update Indicates whether the WTRU supports SP PUCCH p0-normal update | WTRU | No | No | No |

As described above, several embodiments may address potential interference in uplink control transmissions due to radar or other similar narrowband interferers.

Figure 15:
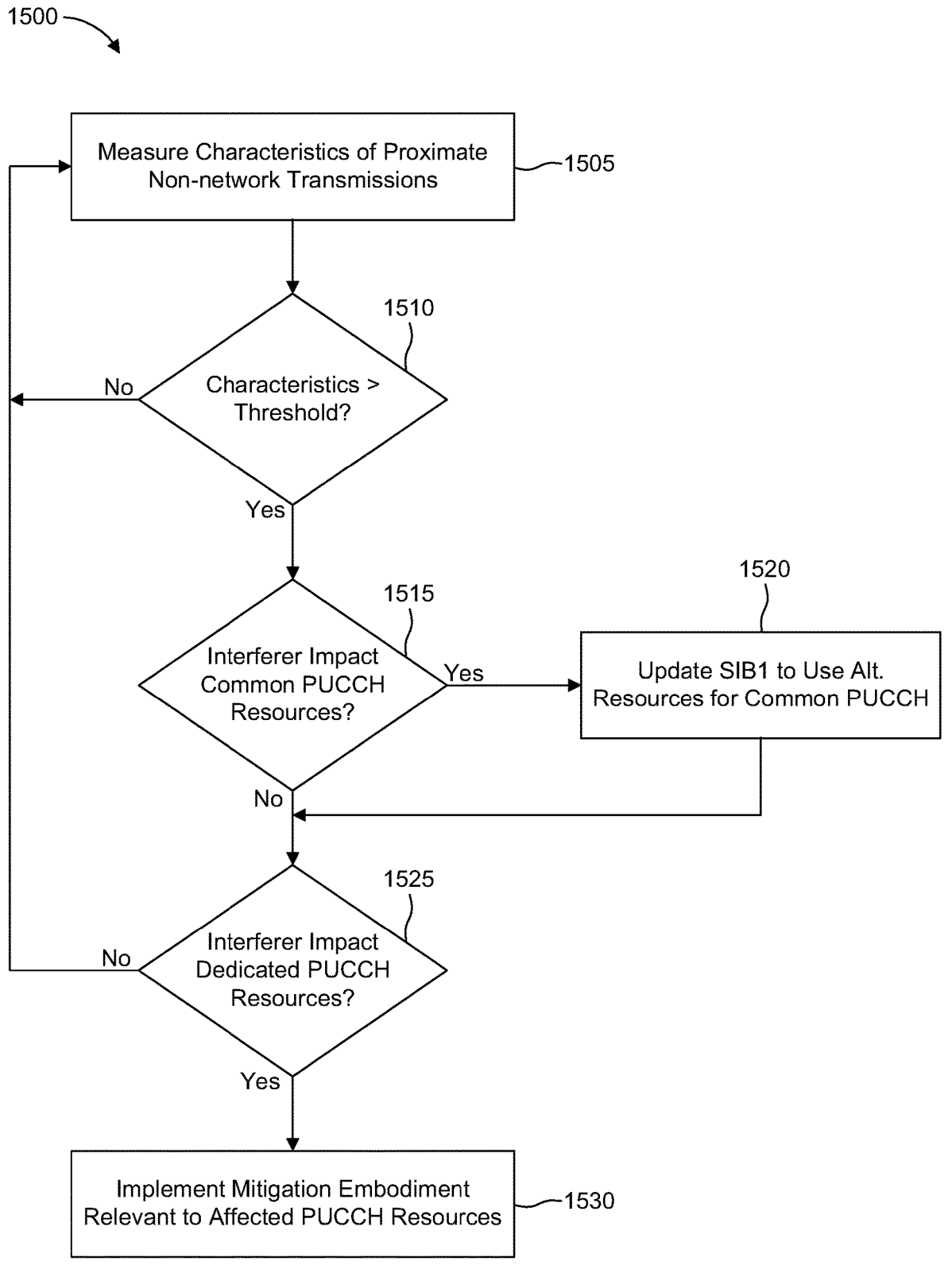
FIG. 15 is a flow diagram showing a method of radar interference mitigation for common and dedicated PUCCH resources according to one example embodiment.

Referring to FIG. 15, a flow diagram outlines an example method 1500 for modifying uplink transmissions in the presence of one or more interferers according to one or more embodiments described herein. In certain embodiments, dynamic reconfiguration of the PUCCH resources may be reporting corresponding to a band edge and/or slot that will not incur interference from active radar presence. The selection of the PUCCH resource for dynamic ACK/NACK reporting can be signaled via the PDCCH DL assignment.

For implementing mitigation 1500, the gNB may select and signal to the WTRU, a PUCCH resource for SPS ACK/NACK reporting corresponding to the band edge and/or slot that will not incur interference from the radar. In one embodiment, the selection of the PUCCH resource for SPS ACK/NACK reporting can be signaled via MAC CE. In another embodiment, the selection of the PUCCH resource for SPS ACK/NACK reporting can be signaled via group common or dedicated DCI.

In other embodiments, referring to FIG. 16, a method 1600 of selecting uplink resources for scheduling requests (SRs) in response to interferer detection may generally include: (i) receiving 1605 configuration information for dedicated PUCCH SR resources including first PUCCH resources and second PUCCH resources. The first and second PUCCH SR resources are diverse from each other in the frequency and/or time domain of an UL BWP. In one embodiment, one or more of the first or second PUCCH SR resources are active for use and the other SR resources are in a suspended state, i.e., they are allocated but not actively used; (ii) transmitting 1610 an uplink scheduling request using the active first or second PUCCH resources; (iii) receiving 1615 signaling from the network to; (iv) change 1620, deactivate and/or suspend one or more of the active $1^{st}$ or $2^{nd}$ PUCCH SR resources; and activate one or more of the suspended $1^{st}$ or $2^{nd}$ PUCCH SR resources. SRs are continued using whichever of the $1^{st}$ or $2^{nd}$ PUCCH SR resources are active and not the ones suspended. Thus upon an interference event triggering, the network may disable PUCCH scheduling request resources that will incur interference from the radar, and enable PUCCH SR resources that will not incur interference from the radar. In one embodiment, the disabling/enabling of the PUCCH resources for SR reporting may be signaled 1615 via MAC CE. In another embodiment, the disabling/enabling of the PUCCH resources for SR reporting can be signaled 1615 via group common or dedicated DCI.

An example of radar mitigation in PUCCH scheduling request resources of the disclosed embodiments is as follows.

Initial PUCCH SR configuration (e.g., FIG. 16, step 1605): 4-"first" PUCCH SR resources are configured on the top edge of the BWP (active/unsuspended) and 4 "first" PUCCH SR resources are configured on the bottom edge of the BWP (active/unsuspended). Additionally, 4-"second" PUCCH SR resources are configured on the top edge of the BWP (inactive/suspended) and 4-"second" PUCCH SR resources are configured on the bottom edge of the BWP (inactive/suspended).

Upon the detection of radar interference occurring in frequencies on the top edge of the BWP, the network may signal a relevant WTRU (i.e., FIG. 16, step 1615) to suspend/deactivate the 4-"first" PUCCH SR resources configured on the top edge of the BWP and activate/unsuspend the 4-"second" PUCCH SR resources configured on the bottom edge of the BWP. In this manner, the full PUCCH SR capacity from the bottom edge of the band is maintained.

In the present embodiments, the time domain properties of the "first" PUCCH SR resources and "second" PUCCH SR resources are not required to be aligned. For example, it is possible that a "first" and a "second" PUCCH SR resources are on the same frequency (or resource block (RB)), but located on different symbols and/or slots in time. In the event a SR is multiplexed with other PUCCH traffic, such as ACK/NACK, then it will not need to use the PUCCH resource dedicated to SR. Interference mitigation may still be obtained using the embodiments disclosed herein, relating to provisioning and signaling relevant to the PUCCH resources utilized.

In yet further embodiments, upon interference event triggering, the network may disable PUCCH CSI reporting resources that will incur interference from the radar, and enable PUCCH CSI reporting resources that will not incur interference from the radar. In one embodiment, the disabling/enabling of the PUCCH resources for CSI reporting may be signaled via MAC CE. In another embodiment, the disabling/enabling of the PUCCH resources for CSI reporting can be signaled via group common or dedicated DCI.

Dynamic Switching of CSI reporting between PUCCH and PUSCH may also be used to mitigate interference to and from radars as detailed above. In these embodiments, the network configures and activates WTRUs with semi-persistent CSI reporting over PUCCH. An external node to the network can determine the interferer characteristics such as carrier frequency, bandwidth, periodicity, dwell time, AoA, and PSD. These measurements can also be determined within the wireless network by observing the measurements relevant to both WTRUs and the gNBs. The network determines the set of WTRUs that impart interference from radar on the PUCCH physical resource blocks (PRBs) and the network deactivates the semi-persistent CSI reporting via MAC-CE and requests aperiodic CSI reporting over the PUSCH outside of the radar bandwidth via DCI for the selected WTRUs.

Lastly, embodiments are disclosed for power boosting of PUCCH transmissions for WTRUs that will incur interference from radars. In these embodiments, the network configures a set of PUCCH target received power P0 via broadcast or dedicated higher layer RRC signaling. An external node to the network can determine the interferer characteristics such as carrier frequency, bandwidth, periodicity, dwell time, AoA, and PSD. These measurements can also be determined within the wireless network by observing the measurements relevant to both WTRUs and the gNBs. Next, the network determines the set of WTRUs that incur significant interference from radar on the PUCCH PRBs. The network selects the target received power P0 used for the PUCCH and activates the P0 value via MAC-CE. In another embodiment, WTRU-group common signaling could be used to select the target received power P0 for PUCCH for a group of WTRUs. In yet another embodiment, dedicated DCI could be used to select the target received power P0 for PUCCH.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for a wireless transmit receive unit (WTRU) comprising:

receiving configuration information including a set of dedicated physical uplink control channel (PUCCH)

resources for scheduling requests (SRs), the set comprising first PUCCH resources of an UL BWP, and second PUCCH resources of the UL BWP different from the first PUCCH resources;

sending one or more SRs using the first PUCCH resources while the second PUCCH resources are suspended from use;

receiving signaling from a network to suspend one or more of the first PUCCH resources, and unsuspend one or more of the second PUCCH resources, wherein the second PUCCH resources are suspended by default, prior to the received signaling; and sending one or more subsequent SRs using only unsuspended PUCCH resources of the UL BWP and not the suspended PUCCH resources, in response to the received signaling from the network.

2. The method of claim 1, wherein each PUCCH resource within the first and second PUCCH resources for SRs are semi-persistently enabled or disabled by a suspend/unsuspend command from the network.

3. The method of claim 1, wherein the received signaling is in response to network detection of an interferer of PUCCH resources.

4. The method of claim 1, wherein the received signaling comprises one of a medium access control (MAC) control element (CE), dedicated downlink control information (DCI) signaling or WTRU group common signaling.

5. The method of claim 1 wherein the received signaling comprises a bitmap designating which PUCCH resources to suspend and unsuspend.

6. The method of claim 3, wherein the suspended one or more of the first PUCCH resources are resources impacted by the interferer and wherein the unsuspended one or more of the second PUCCH resources are resources not impacted by the interferer.

7. The method of claim 3, wherein the interferer comprises a radar.

8. A wireless transmit receive unit (WTRU) comprising:
a transmitter;
a receiver; and
a processor in communication with the transmitter and receiver, the processor and transmitter or receiver configured to:
receive configuration information including a set of dedicated physical uplink control channel (PUCCH) resources for scheduling requests (SRs), the set comprising first PUCCH resources of an UL BWP, and second PUCCH resources of the UL BWP different from the first PUCCH resources;

send one or more SRs using the first PUCCH resources while the second PUCCH resources are suspended from use;

receive signaling from a network to suspend one or more of the first PUCCH resources, and unsuspend one or more of the second PUCCH resources, wherein the second PUCCH resources are suspended by default, prior to the received signaling; and send one or more subsequent SRs using only unsuspended PUCCH resources of the UL BWP and not the suspended PUCCH resources, in response to the received signaling from the network.

9. The WTRU of claim 8, wherein the received signaling is in response to network detection of an interferer of PUCCH resources.

10. The WTRU of claim 8, wherein the received signaling comprises one of a medium access control (MAC) control element (CE), dedicated downlink control information (DCI) signaling or WTRU group common signaling.

11. The WTRU of claim 8, wherein the received signaling comprises a bitmap designating which PUCCH resources to suspend and unsuspend.

12. The WTRU of claim 9, wherein the suspended one or more of the first PUCCH resources are resources impacted by the interferer and wherein the unsuspended one or more of the second PUCCH resources are resources not impacted by the interferer.

13. The WTRU of claim 9, wherein the interferer comprises a radar.

14. The WTRU of claim 8, wherein, prior to receiving configuration information, the processor and transmitter are configured to:
send SR capability information to the network, the SR capability information indicating the WTRU supports semi-persistent PUCCH dedicated SR resource suspension and may only utilize the set of unsuspended dedicated physical uplink control channel (PUCCH) resources for SRs.

15. A base station comprising:
a transceiver; and
a processor in communication with the transceiver, wherein the processor and transceiver are configured to:
send configuration information to a wireless transmit receive unit (WTRU), the configuration information including a set of dedicated physical uplink control channel (PUCCH) resources for scheduling requests (SRs), the set comprising first PUCCH resources of an UL BWP, and second PUCCH resources of the UL BWP different from the first PUCCH resources;

receive one or more SRs from the WTRU via the first PUCCH resources while the second PUCCH resources are suspended from use;

determine an interferer impacts one or more of the first PUCCH resources;

send signaling to the WTRU to suspend use of the impacted one or more of the first PUCCH resources, and unsuspend one or more of the second PUCCH resources not impacted by the interferer, wherein the second PUCCH resources are suspended by default, prior to sending the signaling; and receive one or more subsequent SRs via only unsuspended PUCCH resources of the UL BWP and not the suspended PUCCH resources of the UL BWP.

16. The base station of claim 15, wherein the signaling comprises one of a medium access control (MAC) control element (CE), dedicated downlink control information (DCI) signaling or WTRU group common signaling.

17. The base station of claim 15, wherein the signaling comprises a bitmap designating which PUCCH resources to suspend and unsuspend.

18. The base station of claim 15, wherein the processor and transceiver are further configured to:
determine whether the interferer impacts common PUCCH resources; and if the interferer impacts common PUCCH resources, broadcast updated system information blocks to configure emerging/idle/inactive WTRUs to use alternative common PUCCH resources.

19. The base station of claim 15, wherein the processor and transceiver are further configured to:
prior to the determination the interferer impacts one or more of the first PUCCH resources, determine the interferer transmission exceeds a threshold power level.

* * * * *